United States Patent
Ramezani

(10) Patent No.: US 10,093,487 B2
(45) Date of Patent: Oct. 9, 2018

(54) MOTOR SHAPED AS A ROLLER

(71) Applicant: Kamran Ramezani, La Jolla, CA (US)

(72) Inventor: Kamran Ramezani, La Jolla, CA (US)

(*) Notice: Subject to any disclaimer, the term of this patent is extended or adjusted under 35 U.S.C. 154(b) by 0 days.

(21) Appl. No.: 15/495,208

(22) Filed: Apr. 24, 2017

(65) Prior Publication Data

US 2017/0305676 A1 Oct. 26, 2017

Related U.S. Application Data

(60) Provisional application No. 62/327,190, filed on Apr. 25, 2016.

(51) Int. Cl.
| | |
|---|---|
| *B65G 13/06* | (2006.01) |
| *B65G 13/07* | (2006.01) |
| *B65G 23/08* | (2006.01) |
| *B65G 15/00* | (2006.01) |
| *H02K 16/04* | (2006.01) |
| *H02K 7/14* | (2006.01) |
| *H02K 1/02* | (2006.01) |

(Continued)

(52) U.S. Cl.
CPC ............ *B65G 23/08* (2013.01); *B65G 13/06* (2013.01); *B65G 15/00* (2013.01); *H01F 1/0557* (2013.01); *H02K 1/02* (2013.01); *H02K 1/2733* (2013.01); *H02K 7/14* (2013.01); *H02K 16/04* (2013.01); *H02K 2207/03* (2013.01)

(58) Field of Classification Search
None
See application file for complete search history.

(56) References Cited

U.S. PATENT DOCUMENTS

| | | | |
|---|---|---|---|
| 6,206,181 B1* | 3/2001 | Syverson | ............... B65G 13/06 |
| | | | 198/784 |
| 6,244,427 B1 | 6/2001 | Syverson | |
| 6,288,470 B1 | 9/2001 | Breit | |

(Continued)

FOREIGN PATENT DOCUMENTS

| | | |
|---|---|---|
| EP | 1086522 A1 | 3/2001 |
| WO | 99/65134 A1 | 12/1999 |

OTHER PUBLICATIONS

Potentially related U.S. Appl. No. 15/459,649, filed Mar. 15, 2017.

(Continued)

*Primary Examiner* — Kavel Singh
(74) *Attorney, Agent, or Firm* — The Dobrusin Law Firm, PC

(57) ABSTRACT

A motor comprising: (a) one or more motor stators including a plurality of motor windings; (b) a roller shaft connected to the one or more motor stators, the roller shaft extending along a longitudinal axis of the motor and being adapted to span between two frame members; and (c) a motor rotor including: (i) a roller tube including a key, a key recess, or both, and (ii) one or more ring magnets having: (1) a mating surface shaped to substantially mate to a mating surface of the roller tube and (2) a key recess that receives the key of the roller tube, that receives a separate key that extends into the key recess of one of the one or more ring magnets and the key recess, or both; wherein the one or more ring magnets are produced from a rare earth metal; and wherein the motor rotor carries a load of an article so that the article is moved by the motor rotor.

20 Claims, 12 Drawing Sheets

(51) Int. Cl.
*H02K 1/27* (2006.01)
*H01F 1/055* (2006.01)

(56) References Cited

U.S. PATENT DOCUMENTS

| | | |
|---|---|---|
| 6,455,960 B1 | 9/2002 | Trago et al. |
| 6,570,351 B2 | 5/2003 | Miyazaki et al. |
| 6,710,505 B1 | 3/2004 | Barani et al. |
| 6,794,788 B1 | 9/2004 | Smith et al. |
| 6,879,078 B2 * | 4/2005 | Wolters .................. H02K 1/146 310/216.074 |
| 7,537,107 B2 | 5/2009 | Hall |
| 8,757,363 B2 | 6/2014 | Combs et al. |
| 9,004,263 B2 * | 4/2015 | Hall ....................... B65G 43/00 198/571 |
| 9,490,738 B2 | 11/2016 | Nondahl et al. |
| 2007/0114861 A1 | 5/2007 | Bon et al. |

OTHER PUBLICATIONS

Potentially related U.S. Appl. No. 15/475,553, filed Mar. 31, 2017.

* cited by examiner

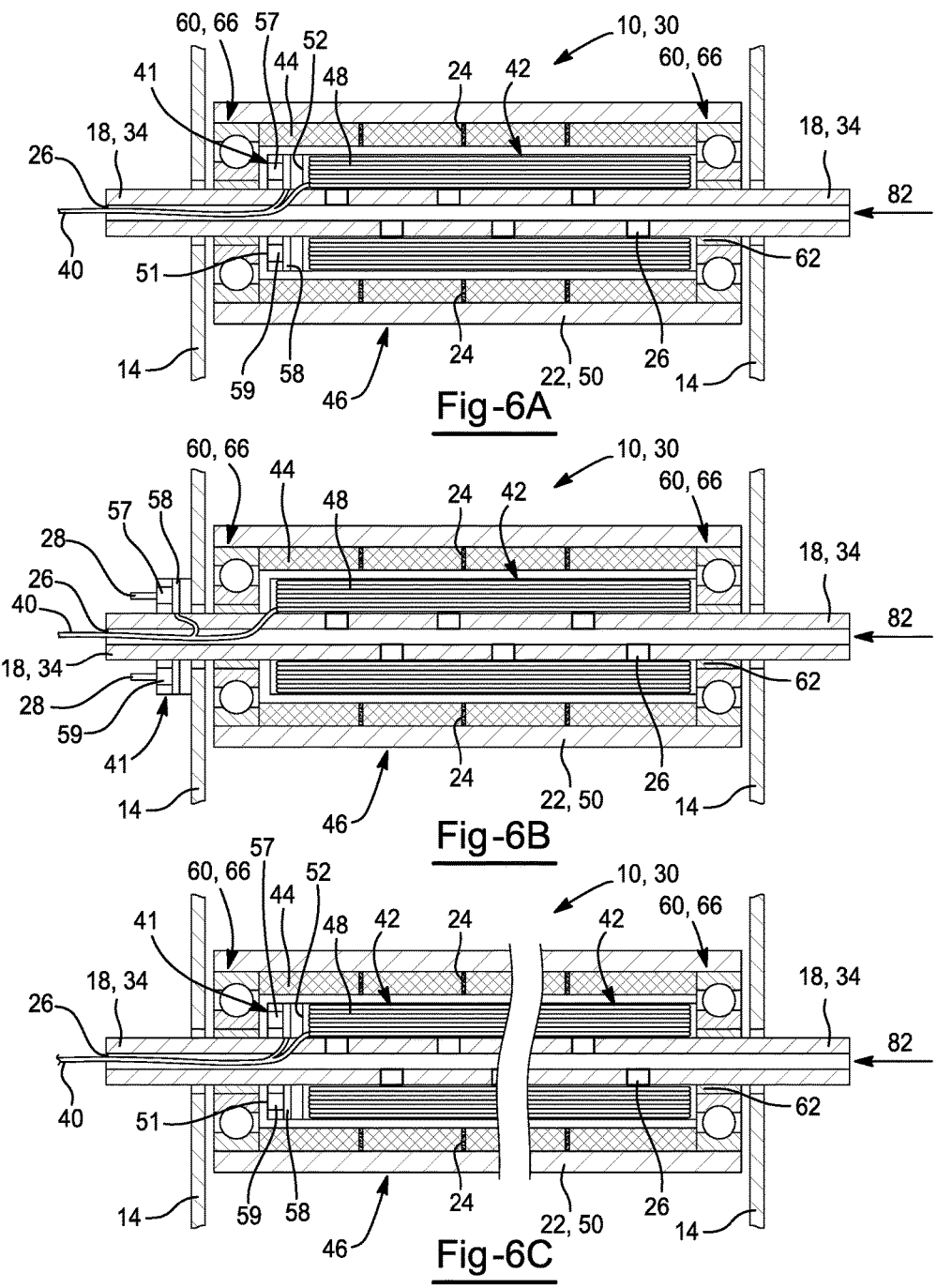

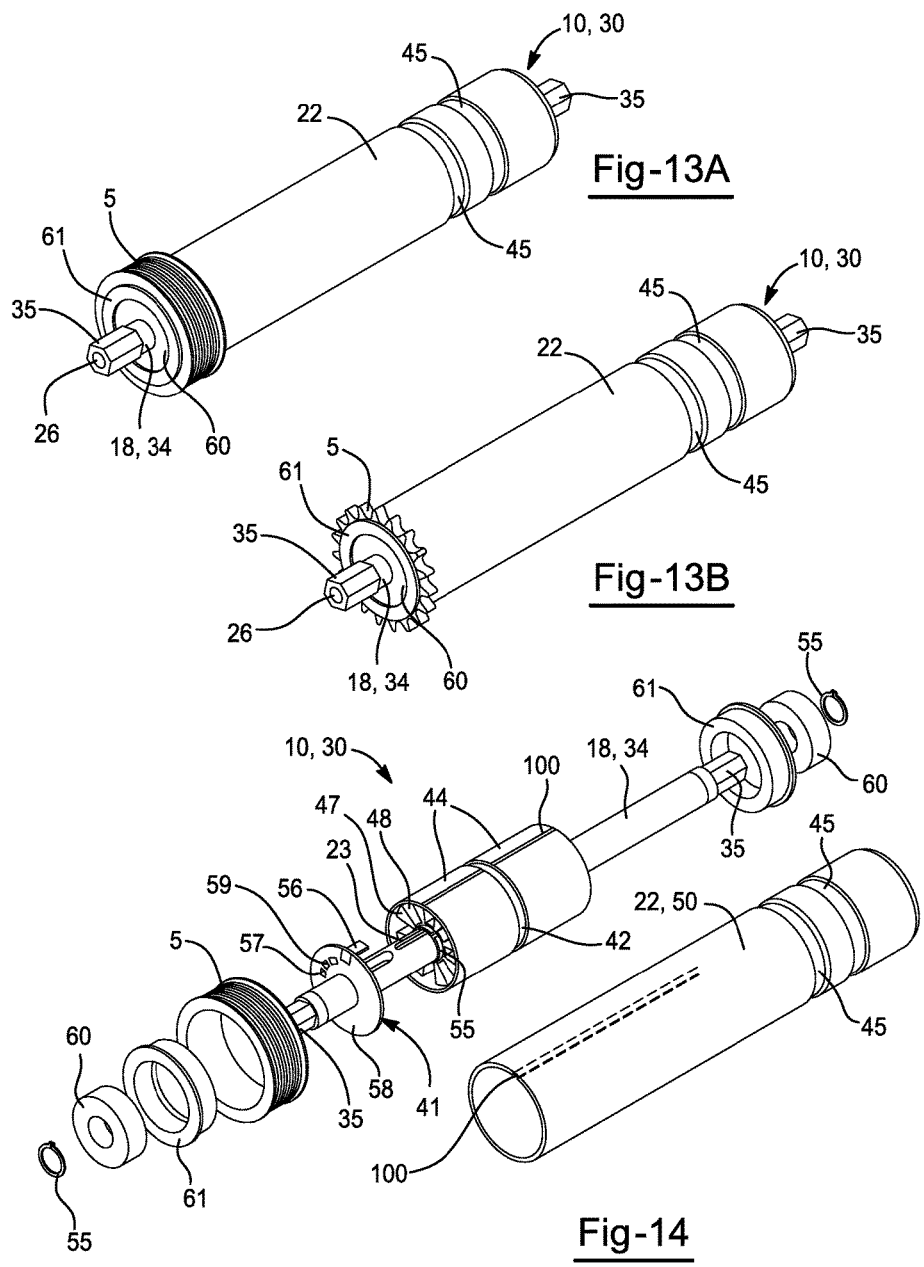

MOTOR SHAPED AS A ROLLER

FIELD

The present teachings generally relate to a motor that is shaped as a roller; the motor includes one or more ring magnets that may be produced using high energy product magnet material by a process of sintering or hot pressing; the ring magnet may be keyed to a roller tube that forms as part of a rotor; the ring magnet may include a plurality of longitudinal pieces with an arc shape that are connected together to form a ring; the motor may be created by a method including installing one or more ring magnets within a roller tube; or a combination thereof.

BACKGROUND

Conveyor systems are used through industries for many reasons such as loading or unloading a truck, moving articles within a machine or factory, or moving articles to a secondary packing location. Conveyor systems typically include a plurality of rollers so that as an article such as a box is placed on the conveyor system the article can be moved without lifting the article as the article moves between two locations. Some conveyor systems only include free rolling rollers that allow an article to move using gravity, a push from a user, or another article pushing a first article down the conveyor. Some conveyor systems are motorized so that one or more of the rollers rotate to move an article along the conveyor system. These conveyor systems generally include a motor within one or more of the rollers or a motor that is suspended from the conveyor frame that rotates one or more of the rollers. The one or more rotated rollers may be coupled to other rollers so that multiple rollers are driven by a motor. During movement a gear box is turned by the motor within the roller and the gearbox moves the roller so that the conveyor system is moved. These motors are typically connected to a controller, which is located at a location separate from the motor.

Examples of conveyor systems may be found in U.S. Pat. Nos. 6,206,181; 6,288,470; 6,710,505; 6,794,788; 7,537,107; 8,757,363; and 9,004,263 all of which are incorporated by reference herein for all purposes. It would be attractive to have a motor that is shaped as a roller. What is needed is a motor including a sintered or hot pressed ring magnet. It would be attractive to have a ring magnet that is connected to a roller tube via keying to create a complementary fit and secure alignment of the magnets within the roller tube. What is needed is a ring magnet that is formed of a plurality of longitudinal pieces connected together in a ring shape. It would be attractive to include a method to insert a ring magnet into a roller tube so that the ring magnet and roller tube are connected together. What is needed is a gearless motor that is easy to manufacture and includes enough torque so that the gearless motor can replace a gear type motorized roller.

SUMMARY

The present teachings meet one or more of the present needs by providing: A motor comprising: (a) one or more motor stators including a plurality of motor windings; (b) a roller shaft connected to the one or more motor stators, the roller shaft extending along a longitudinal axis of the motor and being adapted to span between two frame members; and (c) a motor rotor including: (i) a roller tube, and (ii) one or more ring magnets; wherein the one or more ring magnets are produced from a rare earth metal and the one or more ring magnets are sintered, hot pressed, or both; and wherein the motor rotor carries a load of an article so that the article is moved by the motor rotor.

The present teachings provide: a brushless DC motor comprising: (a) one or more motor stators including a plurality of motor windings; (b) a roller shaft connected to the one or more motor stators, the roller shaft extending along a longitudinal axis of the brushless DC motor and being adapted to span between two frame members; and (c) a motor rotor including: (i) a magnetic material roller tube including a key, a key recess, or both, and (ii) one or more ring magnets magnetized radially with multi poles, the one or more ring magnets having: (1) a mating surface shaped to substantially mate to a mating surface of the roller tube and (2) the one or more magnets being made of neodymium, iron, and boron (NdFeBr) or Samarium and Cobalt (SmCo) and being formed through sintering or a hot press process; (3) a key recess that receives the key of the roller tube, that receives a separate key that extends into the key recess of one of the one or more ring magnets and the key recess, or both; and, wherein a plurality of bearings are located between the roller tube and the roller shaft so that the roller tube and the roller shaft are movable relative to each other.

The present teachings meet one or more of the present needs by providing: a motor comprising: (a) one or more motor stators including a plurality of motor windings; (b) a roller shaft connected to the one or more motor stators, the roller shaft extending along a longitudinal axis of the motor and being adapted to span between two frame members; and (c) a motor rotor including: (i) a roller tube including a key, a key recess, or both, and (ii) one or more ring magnets having: (1) a mating surface shaped to substantially mate to a mating surface of the roller tube and (2) a key recess that receives the key of the roller tube, that receives a separate key that extends into the key recess of one of the one or more ring magnets and the key recess, or both; and wherein the motor rotor carries a load of an article so that the article is moved by the motor rotor.

The present teachings provide: a motor comprising: (a) one or more motor stators including a plurality of motor windings; (b) a roller shaft connected to the one or more motor stators, the roller shaft extending along a longitudinal axis of the motor and being adapted to span between two frame members; and (c) a motor rotor including: (i) a roller tube including a key, a key recess, or both, and (ii) one or more ring magnets having: (1) a mating surface shaped to substantially mate to a mating surface of the roller tube and (2) a key recess that receives the key of the roller tube, that receives a separate key that extends into the key recess of one of the one or more ring magnets and the key recess, or both; wherein the one or more ring magnets are produced from a rare earth metal; and wherein the motor rotor carries a load of an article so that the article is moved by the motor rotor.

The present teachings provide: a motor comprising: (a) one or more motor stators including a plurality of motor windings; (b) a roller shaft connected to the one or more motor stators, the roller shaft extending along a longitudinal axis of the motor and being adapted to span between two frame members; and (c) a motor rotor including: (i) a roller tube, (ii) one or more ring magnets having a mating surface shaped substantially mate to a mating surface of the roller tube; wherein the one or more ring magnets are produced from a rare earth metal; wherein the one or more ring magnets include one or more edges that are parallel and are mated to each other so that rotation of the one or more ring magnets relative to each other is prevented during installation, during running, or both; and wherein the motor rotor carries a load of an article.

The present teachings provide: a motor comprising: (a) one or more motor stators including a plurality of motor windings; (b) a roller shaft connected to the one or more motor stators, the roller shaft extending along a longitudinal axis of the motor and being adapted to span between two frame members; and (c) a motor rotor including one or more ring magnets having a mating surface shaped to substantially mate to a mating surface of a roller tube; wherein each of the one or more ring magnets are comprised of a plurality of segments, each of the plurality of segments include: (1) a first mating end and (2) a second mating end that extends into the first mating end so that the first mating end and the second mating end are nested together to form a ring; wherein the plurality of segments are connected together to form a ring; and wherein the motor rotor carries a load of an article so that the article is moved by the motor rotor.

The present teachings provide: a method of attaching one or more ring magnets to a roller tube, the method comprising: (a) locating a key recess along an exterior surface of the one or more ring magnets, the key recess extending along a longitudinal axis substantially parallel to an axis of rotation of the one or more ring magnets; (b) locating a key recess along an interior surface of the roller tube, the key recess extending along a longitudinal axis substantially parallel to an axis of rotation of the roller tube; (c) aligning the key recess of the one or more ring magnets with the key recess of the roller tube; (d) inserting the one or more ring magnets into the roller tube so that the interior surface of the roller tube mates with the exterior surface of the one or more ring magnets, and the key recess of the one or more ring magnets remains aligned with the key recess of the roller tube; (e) inserting a key into the recesses and substantially filling a shape created by the recesses, locking the one or more ring magnets and the roller tube to stop unsynchronized rotation of the one or more ring magnets, the roller tube, or both.

The present teachings provide a motor that is shaped as a roller. The present teachings provide a motor including a sintered or hot pressed ring magnet. The present teachings provide a ring magnet that is connected to a roller tube via keying. The present teachings provide a ring magnet that is formed of a plurality of longitudinal pieces connected together in a ring shape. The present teachings provide a method to insert a ring magnet into a roller tube so that the ring magnet and roller tube are connected together. The present teachings provide a gearless motor that is easy to manufacture and includes enough torque so that the gearless motor can replace a gear type motorized roller.

BRIEF DESCRIPTION OF THE DRAWINGS

FIG. 6A is a cross-sectional view 6-6 of the master roller of FIG. 4;

FIG. 6B is a cross-sectional view of a motorized roller that is a master roller;

FIG. 6C is a cross-sectional view of a motorized roller that is a master roller;

FIG. 13A is a perspective view of a motorized roller that is a master roller;

FIG. 13B is a perspective view of a motorized roller that is a master roller; and FIG. 14 is an exploded view of a motorized roller that is a master roller.

DETAILED DESCRIPTION

Figure 1:
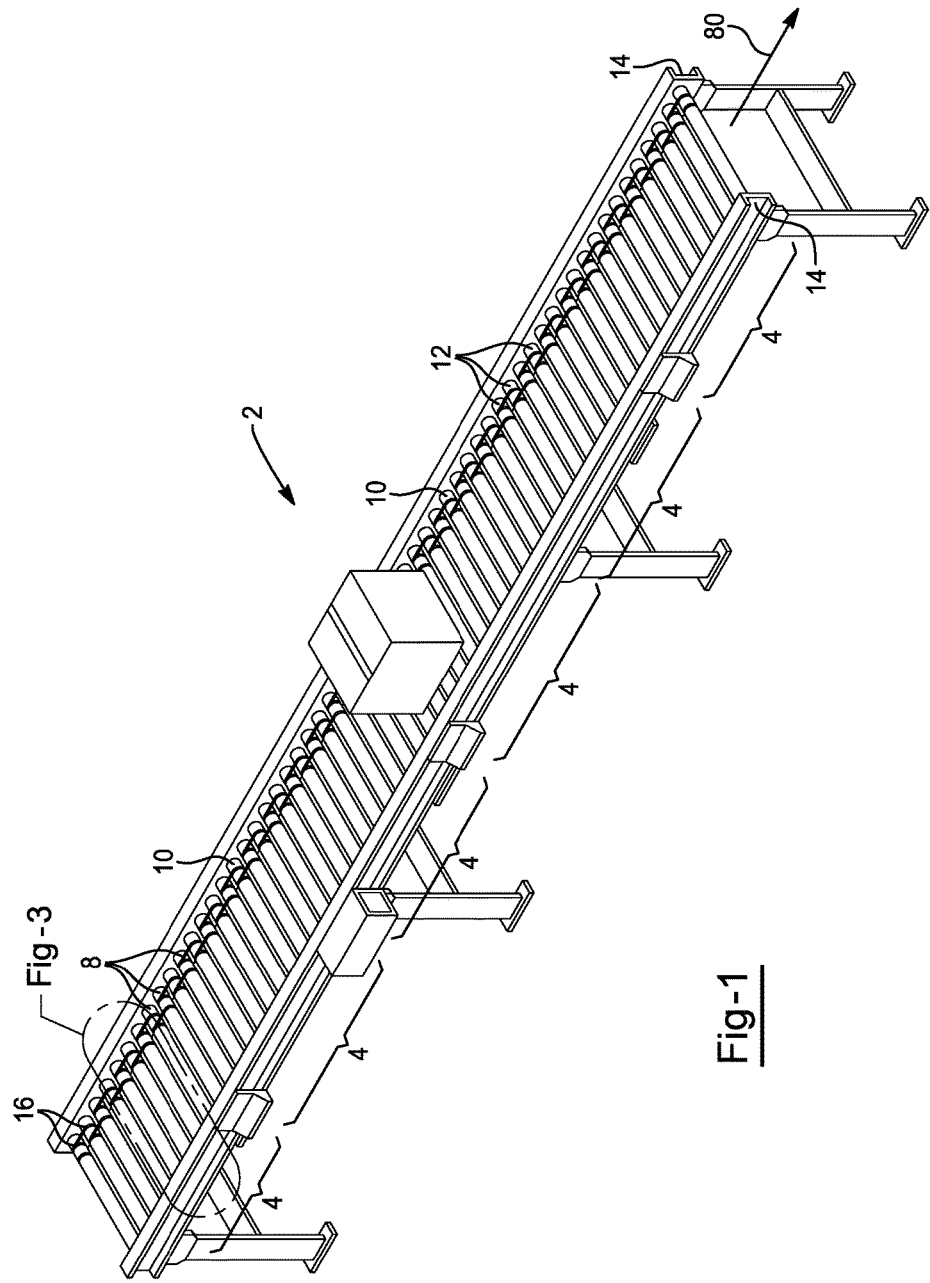
FIG. 1 is a perspective view of a conveyor system that is a roller conveyor.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a motor and controller that are connected to a machine that includes a frame or located between two or more frame members. The frame of the machine is located proximate to one or more controllers that act as a heat sink for the controller components, the motor, or both. The machine may be any machine that includes a frame that supports the motor and controller. The machine may be a non-conveyor system. The machine may be any machine used to form or smooth a material, such a calender for pressing paper. The machine may be a printing press. The machine may be any machine that has a drum used for driving a belt in mining or in treadmills or used in paper mills. Preferably, the machine may be a conveyor system or treadmill.

The conveyor system functions to move articles between two locations. The conveyor system may move items out of a truck, into a truck, within a factory or warehouse, from machine to machine, or a combination thereof. The conveyor system may have one or more interconnected rollers that are driven by a single motor. Preferably, the conveyor system may include a plurality of rollers that are connected together by one or more transfer devices. The conveyor system may be a roller conveyor, a belt conveyor, or a combination of both. The conveyor system may include one or more roller conveyors.

The one or more roller conveyors may function to directly contact an article so that the article moves along the rollers. The one or more roller conveyors may include one or more master rollers and one or more slave rollers. Preferably, each of the roller conveyors include one master roller and a plurality of slave rollers. The roller conveyors may be one section within a conveyor section. The roller conveyors may be connected by a transfer device that covers a portion of each roller and transfers force, torque, or both from one roller to another roller. The one or more roller conveyors may include one or more transfer devices that are located at a single end of the rollers. The roller conveyors may have exposed rollers versus a belt conveyor that includes a transfer device that substantially covers the rollers.

The one or more belt conveyors may function to move an article along the conveyor system by supporting the article on a transfer device (e.g., conveyor belt) that is supported by the rollers. The one or more belt conveyors may include a single transfer device in each zone that moves articles. The one or more belt conveyors may include one or more master rollers that drive each transfer device. The one or more belt conveyors may carry an article along the transfer device and the transfer device may be supported by one or more rollers (e.g., slave rollers), one or more support devices (e.g., a low friction support), or both that are located under the transfer device. The one or more belt conveyors, the one or more roller conveyors, or both may include one or more zones.

The one or more zones may operate independently of one another. Each of the zones may include one or more master rollers. Each zone may include a plurality of slave rollers. Each zone may be driven by one or more master rollers that provide power, torque, or both to a plurality of slave rollers via one or more transfer devices. The zones may each be operated at different speeds. The zones may communicate with one another via one or more controllers.

One or more controllers may be located within each zone, in connection with a motor, in connection with a master roller, or a combination thereof, and each of the one or more controllers may communicate with one another. The one or more controllers may be located within a master roller and in connection with the stator, the rotor, or both. The one or more controllers may operate each zone. The one or more controllers may control the motor of each zone. Each motor may have a standalone controller. The one or more controllers may communicate from one zone to another zone. The one or more controllers may operate a plurality of stators, rotors, or both. The plurality of controllers may be a master controller and one or more slave controllers. The master controller may provide instructions to a plurality of slave controllers. The master controller may be located proximate to one or more motors. The master controller may be located separate from the motor. The slave controllers may be located proximate to the motors. The master roller may be located at a central location and in communication with the slave controllers. The master controller and slave controllers may be in communication via a wire, wirelessly, or a combination of both. The plurality of controllers may be in communication via Wi-Fi, Bluetooth, or both. The controllers may be in communication with a detection device to control the motor. The detection device may be a laser, sensor, photocell, a motor position sensor, or a combination thereof that detects a sustained presence of an object on the conveyor and stops the motor while the detection device detects the presence of an objection.

The controller may include a printed circuit board. The printed circuit board may include one or more power switching devices. The one or more power switching devices may be a metal-oxide semiconductor field-effect transistor (MOSFET); transistor; insulated gate bipolar transistor (IGBT); rectifier; triode for alternating current (TRIAC); bipolar junction transistor (BJT); or a combination thereof. The one or more power switching devices may produce heat during use. The one or more power switching devices may be connected to the printed circuit board and may be directly or indirectly in contact with the controller housing. The one or more power switching devices may be in communication with the frame via a wall of the controller housing, the motor housing, or both. The frame may function as a heat sink for the power switching devices. The one or more power switching devices may directly contact a wall. The one or more power switching devices may be in contact with a wall via a thermal grease, a thermal adhesive, or both. The printed circuit board may include one or more capacitors, one or more resistors, one or more diodes; one or more inductors; one or more microprocessors; one or more switches, one or more thermistors, or a combination thereof. The printed circuit board may be connected to the motor shaft, controller housing, a wall, or a combination thereof via one or more fasteners. The printed circuit board may be free of direct contact with the motor housing, controller housing, a wall, or a combination thereof. The printed circuitry may include surface mounted circuitry. The printed circuit board may be directly mounted to or in contact with a motor housing, controller housing, a wall, or a combination thereof. The printed circuit board may contact controller housing, a wall, or a combination thereof through the one or more power switching devices. The controllers may include memory, a processor, a motor controller, a network interface, terminal block, power source, wired power source, capacitor, zone selector, a position sensor, or a combination thereof. Some of the one or more controllers may be located separate from the motor. Preferably, the one or more controllers may be located within the motor housing, or a controller housing connected to or part of the motor housing. The frame, the controller housing, the motor housing, or a combination thereof may act as a heat sink for the controller, the printed circuit board, the power switching devices, or a combination thereof. Preferably, the frame may be a heat sink for the power switching devices. The power switching devices may be thermally in contact with the frame through the controller housing, the motor shaft, or both. A thermal adhesive or thermal grease may be located between the wall and the controller to promote heat transfer to the wall. The controller may be located within the motor housing, the controller housing, or both. The one or more controllers may be located external of the motor housing, and connected to the motor housing. The one or more controllers may be located within an integrated assembly (e.g., a controller housing). The integrated assembly or controller housing may be directly or indirectly connected to the motor housing, the frame, or both. Each controller may control one motor but may be in communication with another motor so that each zone is coordinated with the adjacent zones (e.g., zones up stream, downstream, or both of a zone of interest). Each controller may function to control a plurality of rollers. Preferably, each controller may control a motor that is associated with one or more master rollers, and the one or more master rollers may provide power to one or more slave rollers. Each controller may include a position sensor or may include sensorless technology that determines the position or speed of a rotor relative to a stator.

The position sensor may determine rotation of the roller by calculating an initial position of the motor, and then tracking a change in a magnetic field of the motor relative to the initial position. The position sensor may be a Hall Effect sensor, a rotary encoder, a resolver, or a combination thereof. The controllers may be free of a position sensor and determine rotational vectors of the roller using a microcontroller (e.g., may be sensorless). Additional aspects of the invention can be gleaned from the teachings herein, including those of U.S. Pat. No. 9,490,738, incorporated by reference herein, which show various embodiments of sensorless detection. The position sensors may determine the position or speed of one or more rollers. Preferably, the position sensor determines the position or speed of a master roller of each zone.

Each zone includes a plurality of rollers. Each of the plurality of rollers spans between two sides of a frame and support articles as the articles are moved along the rollers. Each zone may include one or more cantilever rollers. Preferably, when a cantilever roller is present the cantilever roller is a master roller. The plurality of rollers include one or more master rollers and one or more slave rollers and the master rollers drive one or more of the slave rollers.

The one or more master rollers function to be rotated by a motor, move an article, move one or more slave rollers, or a combination thereof. The one or more master rollers may be a motor (e.g., an outside of the motor may serve to carry a load). Preferably, the master roller is a motor that rotates itself. The one or more master rollers may be an internal motor that includes substantially all of the motor components integrated with the master roller. Preferably, the one or more master rollers are a motor. Preferably, the master rollers are located in a same plane as the slave rollers, other master rollers, or both. The pulley may not directly support articles. The one or more master rollers and the one or more slave rollers may all be located in line. More preferably, the one or more master rollers (i.e., the motor) may directly contact an article moving across the conveyor system. For example, an article may move from the master roller to a slave roller, or may contact the master roller and one or more slave rollers at the same time. The one or more master rollers may be free of any intervening devices between the motor shaft and the roller shaft. The master roller may include a solid roller shaft that extends from a first end of the master roller to a second end of the master roller. The master roller may include a roller shaft that is entirely or partially hollow. The master roller may contact a first side of the frame and a second side of the frame to support the master roller within the conveyor system. The master roller may extend cantilever form the frame. The motor shaft may be located at a first end and a second end and may be terminal so that the motor shaft does not extend through a body of the roller. The one or more master rollers may be located at an end of the conveyor system, in a middle of the conveyor system, or both. The one or more master rollers may be located between one or more slave rollers. The one or more master rollers may include a plurality of slave rollers on each side (e.g., upstream and downstream). The one or more master rollers may be substantially the same size as the slave rollers. The master rollers may be larger than the slave rollers. The one or more master rollers may be smaller than the one or more slave rollers. The one or more master rollers may be connected to one or more slave rollers via one or more transfer devices. The one or more master rollers may directly drive each slave roller via one or more transfer devices. The one or more master rollers may directly drive some slave rollers and indirectly drive some slave rollers via one or more transfer devices. For example, some slave rollers may drive other slave rollers by transfer devices extending between two or more slave rollers.

The one or more slave rollers may function to support one or more articles, one or more transfer devices, or both. The one or more slave rollers may assist in moving one or more articles. The one or more slave rollers may surround the master rollers. The one or more slave rollers may be substantially identical to the master rollers. The one or more slave rollers may extend parallel to the master rollers. Each slave roller is suspended between two pieces of the frame (e.g., a first frame piece and a second frame piece that are parallel to each other). Each zone may include at least one master roller and a plurality of slave rollers. The slave rollers may be connected to the frame at one or both ends. The one or more slave rollers, master rollers, or both may be a support device.

The one or more support devices may function to support a transfer device. Preferably, the support device may support a conveyor belt. The one or more support devices may act as a bearing surface but may be free of rotation. The support devices may have a low friction surface and may act as a roller (e.g., a support). The support devices may be a roller. For example, the support devices may be located under the transfer device and when the transfer device contacted the supports of the support device, the supports may create a low friction contact similar to that of a roller. The one or more support devices may have a smooth surface. The support devices may be made of or include a polymer, metal, polytetrafluoroethylene, urethane, nylon, phenolic plastic, adetal, delrin, polyethylene, polyimide, polysulfone, polyphenylene sulfide, or a combination thereof.

The one or more frames function to support the plurality of rollers or the supports so that articles can move along the conveyor system. The frame may be one or more pieces that support one or more ends of the rollers, a motor, a controller, or a combination thereof. The one or more frames may be "L" shaped, "C" shaped, "U" shaped, "I shaped," or a combination thereof. Preferably, the one or more frames may be two parallel pieces. The one or more frames may connect two or more zones together or extend between two or more zones. The one or more frames may be connected to one or more bearings that support one or more ends of the rollers. The one or more frames may be directly connected to the one or more rollers and the roller shafts may be static relative to the frame and a roller housing may be movable relative to the roller shaft. The one or more motors may be directly connected to the frame. The motors may hang from the frame or extend between opposing portions of a frame 4. The controller housing may be connected to the frame and the motor housing may hang from the frame. The one or more frames may be made of metal and may support the rollers and articles that move along the frame. The frame may support the rollers so that the rollers rotate as the motor and transfer devices provide power between the plurality of rollers.

The transfer devices may function to provide power from a master roller to one or more slave rollers, from a slave roller to one or more adjacent slave rollers, or both. The one or more transfer devices may connect a motor, a master roller, or both to one or more slave rollers. Preferably, the transfer devices only connects rollers to rollers. For example, the transfer devices may connect a master roller to a slave roller or the transfer device may connect two or more slave rollers together. The transfer devices may extend around one or more support devices. The transfer devices may extend around both rollers and supports. For example, ends of a conveyor system may be rollers and between the rollers may be a plurality of supports. The transfer devices may be a belt. The transfer devices may be an "O" belt, "O" ring belt, "V" belt, "V" ring belt, or a combination thereof. The transfer devices may be on continuous piece. The transfer devices may be a plurality of pieces that are connected together. The transfer devices may include one or more grooves and preferably a plurality of grooves. The grooves may have a "V" shape. The grooves may have a complementary fit to grooves in the over roller cartridge. The transfer devices may include one or more spikes or teeth that extend from the transfer device. The transfer devices may be made of or include metal, rubber, fiber, a reinforcement, a natural material, a synthetic material, plastic, a polymer, poly vinyl chloride, urethane, neoprene, nylon, nitrile, polyester, leather, or a combination thereof. The transfer devices may be a chain, a reinforcement coated by rubber, a gear, a toothed member, a belt, or a combination thereof. The transfer device may be one or more flexible couplings.

The one or more flexible couplings may function to connect two or more rollers together in a roller conveyor. The flexible couplings may extend over a roller in an end region of the roller. The one or more flexible couplings may sit within a recess in the rollers. The one or more flexible couplings may be located at one end or both ends in an end region. The one or more flexible couplings may be a single piece. The one or more flexible couplings may be a plurality of things connected together. The one or more flexible couplings may be a chain with a plurality of links. The one or more chains may be made of stainless steel, brass, nickel, aluminum, titanium, carbon fiber, polymers, or a combination thereof. The one or more flexible couplings may be a polymer or rubber that is an endless piece. The flexible couplings may be a gear that extends from one roller to an adjacent roller to provide power form one roller to another roller. The flexible couplings may be used with a conveyor belt, but preferably when a conveyor belt is used the flexible couplings are not used.

The one or more transfer devices may be a conveyor belt. The one or more conveyor belts function to carry an article above a plurality of rollers. The one or more conveyor belts may be supported on the one or more rollers. The conveyor belts may be driven by one or more master rollers. The conveyor belt may be driven by friction between the conveyor belt and the master roller. The conveyor belts may receive the plurality or rollers so that the plurality of rollers are substantially covered by the conveyor belt. The conveyor belt may extend between two sides of the frame. The conveyor belt may be driven by a master roller. The conveyor belt may be one solid piece that is connected together forming an endless conveyor belt. The conveyor belt may be made of rubber, poly vinyl chloride, urethane, neoprene, nylon, nitrile, polyester, leather or a combination thereof. The conveyor belt may extend over a body of the rollers and move independently of the roller shafts.

The one or more roller shafts function to connect the rollers to a frame, a motor, or both. The one or more roller shafts may function to connect a roller shaped motor within a frame. The one or more roller shafts may be fixedly connected to the frame. The one or more roller shafts may function to be move relative to the frame. The roller shaft may be a motor shaft. The roller shaft may function as both the roller shaft and the shaft that extends through the one or more stators. The motor may be mounted to the one or more roller shafts in the shape of the master roller. The one or more roller shafts may be connected to one or more bearings. The one or more roller shafts may be connected to a frame by one or more bearings. Preferably, the motor shaft is directly connected to the frame and all or portion of the roller rotates around the roller shaft. The one or more roller shafts may be connected to the body of the roller by one or more bearings. The one or more roller shafts may move with the roller body (i.e., a fixed roller shaft). The one or more roller shafts may move independent of the body of the roller (i.e., a movable roller shaft). The one or more roller shafts may extend cantilever from a body of a roller. The one or more roller shafts may support the roller on the frame. The one or more roller shafts may be solid, hollow, have a smooth exterior, or a combination thereof. One or more wires may extend into the motor (or master roller) through the roller shaft. The one or more roller shafts may be hollow and air may flow through the roller shaft to cool the motor. The one or more roller shafts may have a cross-sectional shape that is circular, triangle, square, oval, pentagon, hexagon, octagon, heptagon, decagon, nonagon, or a combination thereof. The one or more roller shafts may function to allow the roller to rotate. The one or more roller shafts may function to carry a load, apply a load to a frame, or a combination thereof. The one or more roller shafts may extend into a bearing, a motor, or both. The one or more roller shafts may be fixed relative to the frame. The one or more roller shafts may have a smooth exterior. The one or more roller shafts may include one or more grooves and may be connected to one or more shaft covers.

The one or more shaft covers connect to a distal end, a proximal end, or both of a roller. The one or more shaft covers receive an end of a roller and connect the roller to a bearing, a controller housing, a frame, or a combination thereof. The roller shaft may be pressed into a shaft cover. The one or more shaft covers may be connected to the shaft using an adhesive, fasteners, welding, interlocking (i.e., a male portion and a female portion), or a combination thereof. The one or more shaft covers may be shaped substantially similar to the roller shaft, or different. For example, the one or more shaft covers may receive a round roller shaft, thereafter connecting the roller shaft to one or more bearings using a hexagonal shaft of the one or more shaft covers. The one or more shaft covers may be made from a similar material to that of the roller shaft, or different.

The one or more grooves may receive one or more transfer devices. The one or more grooves may be located in the roller tube, in the roller shaft, or both. The roller tube may include two or more grooves. The roller tube may include grooves, over roller cartridges, or both. The one or more grooves may receive one or more bushings. The one or more grooves may be sufficiently deep so that the one or more transfer devices, bushings, or both are flush with a body when the transfer devices are located within the grooves. The one or more grooves may assist the transfer devices in rotating the rollers. The one more grooves may be located in an end region of the motor shaft, the roller shaft, or both. The one or more grooves may transfer a force from the master roller (i.e., motor) to one or more slave rollers. The one or more motors may function to move one or more master rollers.

The over roller cartridge may receive one or more transfer devices. The over roller cartridge may receive a V-belt, O-belt, chain, or a combination thereof. The over roller cartridge is connected to an exterior surface of a roller tube. The over roller cartridge may be connected to a master roller, a slave roller, or a combination thereof. The over roller cartridge may receive the one or more transfer devices from an over roller cartridge of another roller. The over roller tube may receive the one or more transfer devices from one or more grooves of another roller. The over roller cartridge may be connected near a terminal end of the roller. The over roller cartridge may be connected near a center of the roller. The over roller cartridge may be press-fit, adhered, fastened, welded, interlocked (i.e., a male and female connection) with the roller tube. The over roller cartridge may be removable. The over roller cartridge may have a shape substantially similar to the transfer device being received. For example, the over roller cartridge may have one or more hooks to receive a chain, or have a V-shaped groove to receive a V-belt. The over roller cartridge may be made from a substantially similar material to the roller tube, or a different material. The over roller cartridge may vary in width to accommodate different width transfer devices. The over roller cartridge may transfer a force from the master roller (i.e., motor) to one or more slave rollers.

The one or more motors may directly drive the one or more master rollers. The one or more motors may be sufficiently large to drive the master roller and one or more slave rollers, preferably four or more slave rollers, more preferably six or more slave rollers, even more preferably eight or more slave rollers, and most preferably ten or more slave rollers. The one or more motors may be formed so that the one or more motors are a master roller. The motor may run from alternating current source. The motor may run from direct current (DC) source. The motor may be a brushless motor. Preferably, the motor is a direct current brushless motor (e.g., brushless DC motor). The motor may include a motor shaft, shaft cover, bushing, motor cover, wires, controller, motor stator, magnets, motor rotor, motor hub, motor windings, or a combination thereof. The motor may be free of contact with a gear box. For example, the motor may be the master roller so that intervening gear boxes are not needed to rotate all or a portion of the master roller. The frame may dissipate heat generated by the motor. The motor may be in direct contact with the frame and the frame may be a heat sink for the motor (e.g., the motor shafts may be connected to the frame and the frame). One or more wires may extend through the roller shaft, the motor shaft, or both.

The one or more wires function to provide power, signal, or both to and/or from the controller, the motor, or both. The wires may connect the motor, the controller, or both to a power source. The wires may connect the motor, the controller, or both to one or more sensors. The wires may connect the motor and that controller. The one or more wires may have a sufficient gauge to carry power, signals, or both to the motor, the controller, or both, or between the controller and the motor. The wires may run through the hollow motor shaft, roller shaft, or both. The motor is connected to at least 2 wires (a positive and a negative). The motor may be connected to a signal wire. The controller may be connected to 2 or more wires of three or more wires. For example, the controller may be connected to a positive, a negative, and a signal wire. The one or more wires may directly power the controller, the motor, or both. Preferably, the wires are connected to the controller and extend from the controller to the motor.

The one or more controllers function to control the motor, a master roller, a zone, the conveyor system, or a combination thereof. The one or more controllers may be located proximate to the motor. The one or more controllers may be located in a central location. The one or more controllers may be located inside of the motor or the motor housing. The one or more controllers may be connected to the roller shaft, the frame, a controller housing, or a combination thereof. The one or more controllers may be connected to the frame. The one or more controllers may be directly connected to the motor frame, be located outside of the motor, or both. The one or more controllers may control one or more motor rotors, a power source, or both. The one or more controllers may be located within a controller housing.

The one or more controller housings may function to house the controller, contact the controller, or both. The one or more controller housings may include a pocket that houses the controller (e.g., an integral pocket). The pocket of the controller housing has a plurality of walls. The controller may be directly connected to a wall of the pocket of the controller housing. The controller, a printed circuit board of the controller, or both may be directly connected to a wall of the controller housing. The controller, the printed circuit board, or both may extend generally parallel to a wall of the pocket and be connected to the wall so that the area (length*width) faces the wall. The power switching devices of the controller may be in contact with the controller housing, the frame, a wall in contact with the frame, or a combination thereof. The conveyor system may be free of a controller housing. For example, the master roller may be the motor, thus, the motor is not located within a housing. The conveyor system may be free of a controller housing, a controller pocket, or both when the controller is located within the motor. The controller housing may be directly connected to the frame. The controller housing may have a geometric shape. The controller housing may be a rhombus. The controller housing may be a square, rectangle, a shape with chamfered corners, one or more flat walls, or a combination thereof. The controller housing may include a through hole. The motor shaft, a roller shaft, or both may extend through the controller housing. The controller housing may be "U" shaped and the motor shaft, the roller shaft, or both may extends through the controller housing. The controller housing may be in two or more pieces and the motor shaft, the roller shaft, or both may extend between the pieces of the controller housing. The controller housing may be free of contact with the motor shaft, the roller shaft, or both. The controller housing may include one or more faster holes. Preferably, the controller housing includes a plurality of fastener holes. The fastener holes may connect the controller housing to a frame, the motor housing, or both. The controller housing may have one set of fastener holes for connecting to the frame and a second set of fastener holes for connecting to the motor housing. Preferably, the fastener holes extend through the controller housing so that one set of fasteners (e.g., screws, bolts, a threaded member, rivet) extend from the frame through the controller housing and into the motor housing to connect the frame, motor housing, and controller housing all together. The controller housing may be free of separate mounting ears that extend from the controller housing to form a connection with the frame (e.g., a mounting support that extends outward from the housing). The one or more controllers may be located outside of the motor stator. The one or more controllers may be integrally part of the motor stator, motor shaft, or both.

The one or more motor stators may function to move one or more rotors. The motor stator may be located within a master roller. The motor stator may include all or a portion that is housed within a magnet, roller tube, or both. The one or more motor stators may be two or more motor stators that are spaced apart with in the rotor. For example, there may be two discrete motor stators and two discrete rotors that are connected to a roller tube so that the roller tube and the magnets are rotated. The multiple motor stators are present the motor stators may be located on opposing ends of a roller tube. When multiple motor stators are present the motor stators may both be located at a same end of roller shaft. When multiple motor stators are present the motor stators may be located in a center of the roller tube. The motor rotor may include one or more magnets, one or more motor windings, or both. The motor stator may be powered to move the motor rotor by powering one or more windings of the motor stator. The one or more windings may be coiled or otherwise wrapped around the motor stator and receive power. The one or more windings may be copper, nickel, silver, silver coated copper, a conductive metal, or a combination thereof. The windings may be in the form of a continuous wire, coils, or separate wires interconnected. The motor stator may be free of contact with the magnets, the rotor, or both. The motor stator may assist in moving a motor rotor so that the motor rotates a master roller. Preferably, the motor stator in located within a center of the motor, in contact with a motor shaft, or both and the one or more magnets, roller tube, or both extend around the motor stator. The motor rotor, a plurality of magnets, or both, may extend around the motor stator The one or more of magnets may function to rotate the rotor when the motor windings are powered. The one or more magnets may be a solid permanent ring magnet. The one or more ring magnets may be a single ring magnet. The one or more magnets may be a plurality of magnets. The ring magnet may be a segmented ring magnet. The segments may be connected together to form a ring magnet. The plurality of magnets may extend around an outside of the motor rotor. The plurality of magnets may form a ring magnet. The motor may include an even number of magnets. The motor may include an odd number of magnets. The plurality of magnets may be 2 or more, 4 or more, 5 or more, 6 or more, 7, or more, 8 or more, 9 or more, or even 10 or more magnets. The plurality of ring magnets may be a plurality of pieces that are connected together axially. The plurality of ring magnets may be a plurality of pieces that are radially connected together to form a ring (e.g., arc shaped segments). The plurality of magnets may be about 25 or less, 20 or less, or 15 or less magnets. The magnets may be made of or include a ferrous metal, neodymium, iron, boron, samarium, cobalt, rare earth metals. The one or more magnets may be formed using sintering, hot pressing, molding, or combination thereof. Preferably, the magnets may be formed by sintering or hot pressing so that the magnets are substantially pure. The one or more magnets may be formed using an adhesive. Preferably, the one or more magnets may be free of an adhesive. The one or more magnets may be coated using nickel, gold, chrome, copper, an epoxy resin, or a combination thereof. The one or more magnets may have a corrosion resistant coating. The one or more magnets may be coated with a sacrificial coating (e.g., zinc). The one or more magnets may be coated with a coating that does not affect the magnetism of the magnets. The coating may be an electroplated coating, a spray on coating, a hot dip coating, a rolled on coating, a baked on coating, or a combination thereof. The magnet may be substantially free of burrs. The one or more magnets may be connected to the motor rotor. The one or more magnets may be axially connected, arc shape connected, or both by an adhesive or alignment tabs to form part of a motor rotor, the roller tube, or both. The one or more magnets may form a portion of the rotor. Preferably, the one or more magnets are connected via an adhesive and are free of alignment tabs (e.g., a male member that extends axially into a female member of another magnet so that the magnets are maintained in alignment). For example, axial ends of the magnets are substantially flat and each end is flat and planar. The ends of the magnets may be complementary to each other. The one or more magnets may be connected (e.g., arc shape connected) to form one or more ring magnets by an adhesive or connection mechanism. The connection mechanism may be a shaped portion of a mating end of a magnet. The one or more magnets when connected (e.g., arc shape connected) may have a plurality of semi-circular pieces (i.e., ring magnet segments) that when connected together form a complete circle. A magnet may include ring magnet segments that connect together to form a ring and the magnet may include 2 or more ring magnet segments (or pieces), 3 or more ring magnet segments, 4 or more ring magnet segments, 5 or more ring magnet segments, 6 or more ring magnet segments, 7 or more ring magnet segments, or 8 or more ring magnet segments. The magnet may include 20 or less ring magnet segments, 15 or less ring magnet segments, or 10 or less ring magnet segments. The ring magnet segments (e.g., arc shape pieces) may form about 10 degrees or more, about 30 degrees or more, about 45 degrees or more, about 60 degrees or more, or about 90 degrees or more of a circumference of a ring magnet. The arc shape pieces may form about 180 degrees or less or about 120 degrees or less of a circumference of a ring magnet. The ring magnet may include an equal number of ring magnet segments and poles. The ring magnet may include more ring magnet segments than poles. The ring magnet may include one more ring magnet segment than pole. For example, the ring magnet may be made of 15 ring magnet segments and the ring magnet may be magnetized with 14 poles after the arc magnet segments are connected together. The ring magnet may include twice as many poles as ring magnet segments. For example, the ring magnet may include 16 ring magnet segments and 32 poles. The ring magnets may be magnetized so that one ring magnet segment includes one magnetization. For example, the ring magnet segment may be north or south. The ring magnet segment may include two or more types of magnetization. For example, each segment may include a part that is north and a part that is south. The ring magnet segments may include magnetization that are parallel to the longitudinal axis, the motor axis, or both. The ring magnet segments may include magnetization that is skewed relative to the longitudinal axis, the motor axis, or both. Each of the pieces may have a shape so that each of the pieces fit together. Each piece may have a mating end (e.g., axially or radially). For example, a first mating end of a first piece may form a complementary connection with a second mating end of a second piece, and the first mating end of the second piece may extend into a second mating end of third piece until a complete ring is formed. The mating ends may be flat. The mating ends may be contoured to connected together. One mating end may include a female feature. One mating end may include a male feature. The male features and the female features may connect together so that a ring is formed. The mating end (e.g., connection mechanism) may be v shaped, semi-circular shaped, U shaped, W shaped, M shaped, or a combination thereof. The one or more magnets may be joined together without an adhesive to form part of a motor rotor. The arc shaped pieces may be touching each other at the mating ends. The arc shape pieces may not touch each other at the mating area, but be connected to each other via spacers or molding material. The one or more magnets may have a keying mechanism or key recess and/or key to mate with a roller tube.

The roller tube may function to support and article, move an article, or both. The roller tube may encompass the motor. The roller tube may be the outer surface of the motor (and the master roller). The roller tube may be a motor housing. The roller tube may be connected to the roller shaft by one or more bearings. The roller tube may connect to the one or more magnets to form the motor rotor. The roller tube may include one or more key recesses, keys, or both to mate with the one or more magnets. For example, the one roller tube may have a key recess that receives a key that is integrally formed with the magnet, over vice versa. If the roller tube includes a key recess then a separate key is inserted into the key recess of the roller tube and the magnet. The separate key may be inserted into the key recess of the roller tube before the magnets are installed into the roller tube. The roller tube and one or more magnets may both have a key recess to receive a separate key that is inserted to connect the roller tube and one or more magnets. The key may be a separate key that is formed of a substantially similar material as the roller tube or a different material. The roller tube may extend axially along the length of the roller shaft and terminate substantially near the frame. Preferably, the roller tube is round (i.e., has a circular cross-section), and an interior surface of the roller tube mates with an exterior surface of the one or more magnets to form a motor rotor surrounding the motor stator.

The motor rotor may function to move one or more rollers. The motor rotor may be connected to the motor shaft through bearings. The motor rotor may surround the motor stator, rotate about the motor stator, or both. A plurality of magnets may be spaced apart in the motor rotor. The plurality of magnets may be connect axially edge to edge (i.e., adhered together) in the motor rotor. The motor rotor may be rotated by the motor stator, the windings, or both. The motor rotor may be rotated by the magnets when the motor windings are powered. The motor rotor may include a hub that is connected to the motor shaft through bearings. The one or more motor windings may be wound around the hub.

The one or more motor windings function to rotate the rotor when the motor windings are powered. The one or more motor windings may move the magnets when the motor windings are powered. The motor may include a plurality of motor windings. The motor windings may be complementary to the magnets. The motor may include an odd number of motor windings. The motor may include 2 or more, 4 or more, 6 or more, 8 or more, 10, or more, 12 or more, 14 or more, 16 or more, 18 or more, or even 20 or more motor windings. The plurality of motor windings may be about 50 or less, 40 or less, or 30 or less motor windings. The motor windings may be located inward of the magnets (i.e., the magnets may extend around the motor windings). The motor windings may be surrounded by the one or more magnets, the roller tube, or both. The motor windings may be located within the motor housing to rotate the motor rotor resting on motor shaft by one or more bearings.

The motor housing is the roller tube. The motor housing may function as both a housing and a rotor. The motor housing serves as the back iron the magnetic poles mounted inside to transfer the magnetic field. The motor housing may be round. The motor housing may have an empty center (e.g., an internal pocket or a motor pocket) that receives the motor rotor, the motor stator, or both. The motor housing may include one or more internal pockets. Preferably, the motor housing includes at least a motor pocket. The motor housing may include a single pocket and the one or more motor stators and the one or more controllers may be located within the single pocket. The motor housing may be connected to the motor shaft by bearings so that the motor housing rotates about the motor shaft (i.e., the roller tube rotates about the roller shaft).

The one or more bearings may function to support the motor shaft as the motor shaft is rotated. The one or more bearings may be end caps or part of end caps of the roller tube. The one or more bearings may permit the roller tube, rotor, or both to rotate relative to the motor shaft, motor stator, roller shaft, frame, or a combination thereof. The one or more bearings may be connected to the frame. The one or more bearings may be free of contact with the frame. The one or more bearings may allow the rollers to rotate about an axis. The one or more bearings may be located within a body (e.g., roller tube) of the roller. The one or more bearings may extend between the body of the roller and the roller shaft. The one or more bearings may have a different geometry along an outer diameter and an inner diameter. For example, the one or more bearings may have a round outer diameter to mate with the roller tube, and have a hexagonal inner diameter to mate with the roller shaft. The one or more bearings may be a flange bearing. The bearing may be located within a housing that includes one or more flanges. The one or more flanges may function to connect the bearing to the frame. The one or more flanges may support the bearing on the frame but allow for some movement of the bearing relative to the frame, the flanges, or both. The one or more flanges of the flange bearing may receive one or more fasteners for connecting the bearing to the frame. The one or more bearings may be connected to the roller shaft, the motor shaft, the roller tube, or a combination thereof. The one or more bearings may be connected using a snap ring, a clamp band, a retaining ring, or a combination thereof. The one or more bearings may be prevented from moving axially by one or more snap rings, clamps, retaining rings, circlips, or a combination thereof. The one or more bearings may be flexible. The one or more bearings may be flexible so that the roller shaft may not be perpendicular to the frame on the drive side and/or the ride side. The one or more bearings may include a flexible sleeve that permits movement of the roller shaft.

The one or more flexible sleeves may function to permit movement of the bearing, the roller shaft, or both relative to each other. The one or more flexible sleeves may be a plurality of flexible sleeves. The one or more flexible sleeves may be located between the bearing and the roller shaft. The one or more flexible sleeves may be located between an outer ring of the bearing and the bearing housing. The one or more flexible sleeves may be located between the outer ring of the bearing and the body of the roller. The one or more flexible sleeves may permit the roller shaft to move about 1 degree or more, about 2 degrees or more, about 5 degrees or more. The one or more flexible sleeves may permit the roller shaft to extend between the frames when the connection points (e.g., bearing, hole in frame, motor shaft) are not collinear. The flexible sleeve may assist when the center of the bearings and a central axis of the roller shaft are not collinear, when the center of the bearings and a central axis of the roller shaft are not concentric. The flexible sleeves may allow a center of the bearing to move without affecting the ability of the bearing to rotate. The bearing may be a spherical plain bearing. The bearing may have a ball and socket arrangement so that an inner race can move relative to an outer race. The bearing may permit angular rotation about a central axis point in one or more orthogonal directions or two or more orthogonal directions. The flexible sleeve may be made of or include metal, rubber, fiber, a natural material, a synthetic material, plastic, a polymer, poly vinyl chloride, urethane, neoprene, nylon, nitrile, polyester, leather, or a combination thereof. The one or more flexible sleeves may function to rotate in an upstream direction (e.g., in the forward direction) or a downstream direction (e.g., in the rearward direction). The one or more flexible sleeves may be used with or in lieu of a frame with adjustable portions. The one or more bearings with the flexible sleeves may be housed in one or more bearing housings.

The one or more bearing housings house the one or more bearings. The one or more bearing housings may connect the one or more bearings to the frame, a master roller, a slave roller, or a combination thereof. The one or more bearing housings may prevent debris from reaching the one or more bearings. The one or more bearing housings may be shaped substantially similar to the one or more bearing housings, or different. For example, the one or more bearing housings may have an inner diameter similar shaped substantially similar to an outer diameter of the one or more bearings (i.e., circular), and the one or more bearings may have an outer diameter shaped substantially similar to an inner diameter of a master roller (i.e., circular). The one or more bearing housings may be made from a similar material to the one or more bearings, or different. The one or more bearing housings may be coated to prevent rust of degradation. The coating may be zinc, aluminum, electrophoretic paint, or a combination thereof.

The adjustable portions may function to permit movement of a roller shaft, the motor shaft, bearings, or a combination thereof so that the rollers may be adjusted to be substantially parallel with both side of the frame. The adjustable portions may be a through hole in the frame that permits movement of the motor shaft, the bearings, or both along the machine direction. The adjustable portions may be an oblong hole in the frame. The adjustable portions may allow the bearings to slide along the frame when the fasteners are loosened. The adjustable portions may be oval.

The motor may be created by a method. The method steps may be created in virtually any order. The method may include inserting a key into the key recess of the roller tube, the magnet, or both. The key may be inserted into the key recess of the roller tube and then the magnets may be inserted into the roller tube so that the key extends into the key recess of the magnet. The key may be an integral part of the roller tube and the key recess of the magnet may be aligned with the key of the roller tube. The magnets may be axially connected together with an adhesive. The magnets may be radially connected together with an adhesive. A first mating end of a first ring magnet segment may be aligned with a second mating end of a second ring magnet segment. A first mating end may be nested into a second mating end. A controller may be placed in a controller housing. The controller housing may be connected directly to a frame. One or more power switching devices may be connected to and in contact with the controller housing, the frame, or both.

FIG. 1 illustrates a conveyor system 2 including a plurality of rollers 8 located between two frame members 14. The rollers 8 include master rollers 10 that are connected to slave rollers 12 that are driven by the master rollers 10. A motor 30 (not shown) is located inside of the master rollers 10 to rotate the master roller 10 and subsequently the slave rollers 12 via transfer devices 16. The conveyor system 2 includes a plurality of zones 4 with a master roller 10 in the center of each zone 4 so that slave rollers 12 are located on each side of the master rollers 10. The master rollers 10 move the slave rollers 12 in the direction 80 via one or more transfer devices 16.

Figure 2A:
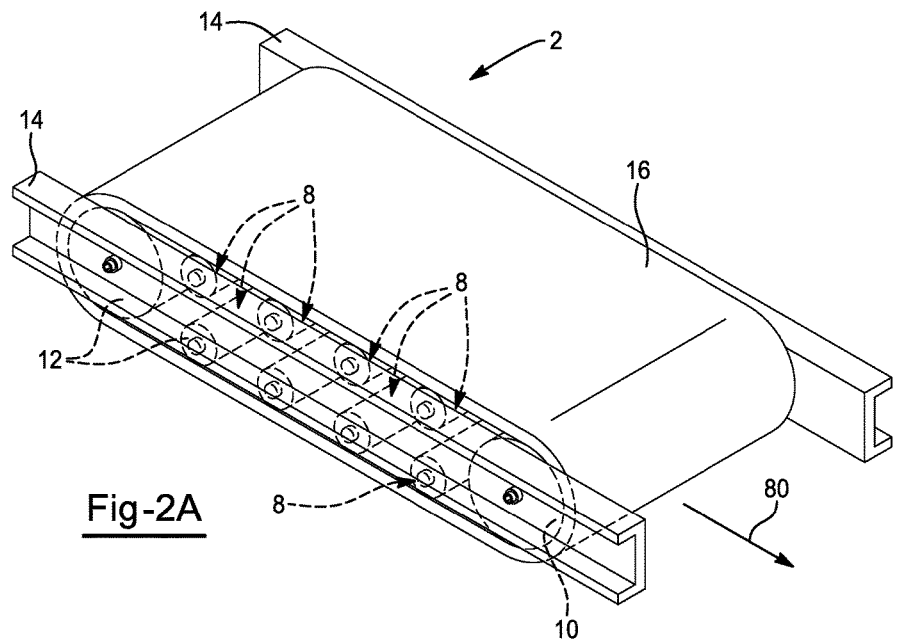
FIG. 2A is a top perspective view of a conveyor system that is a belt conveyor.

FIG. 2A illustrates a conveyor system 2 with a plurality of rollers 8 located between two frame members 14. The plurality of rollers 8 include a master roller 10 and slave rollers 12 that support a transfer device 16 that wraps all of the rollers 8. The master roller 10 includes an internal motor 30 (not shown) so that the motor 30 directly drives the master roller 10 and the master roller 10 drives the slave rollers 12 in a direction 80 via the transfer device 16.

Figure 2B:
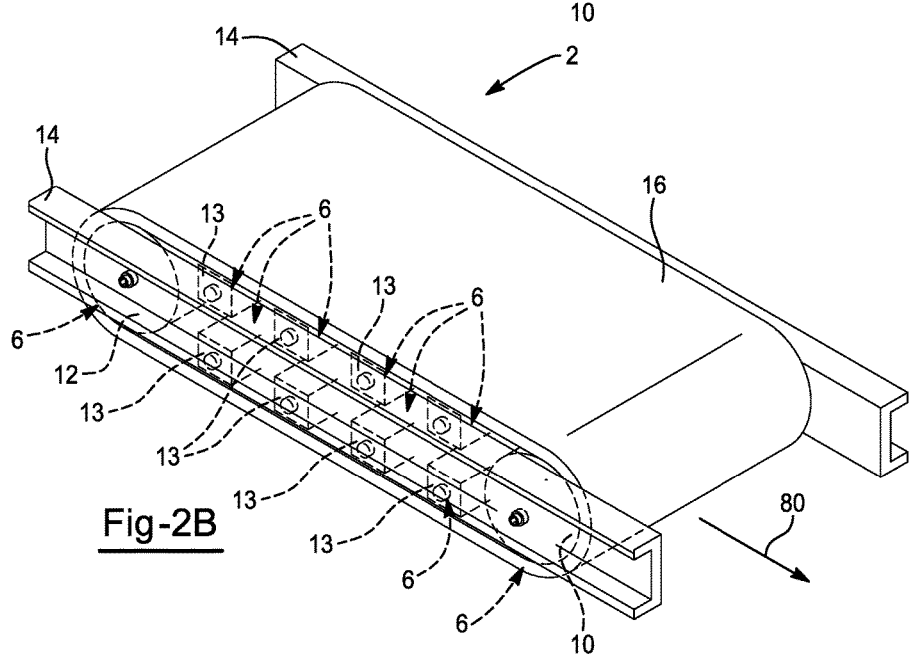
FIG. 2B is a top perspective view of a conveyor system including support devices that is a belt conveyor.

FIG. 2B illustrates a conveyor system 2 with a plurality of support devices 6 located between two frame members 14. The plurality of support devices 6 include a master roller 10 and slave rollers 12, some of which are supports 13, that support a belt 16 that wraps all of the rollers 8. The master roller 10 includes an internal motor 30 (not shown) so that the motor 30 directly drives the master roller 10 and the master roller 10 drives the slave rollers 12 in the direction 80 via the belt 16.

Figure 3:
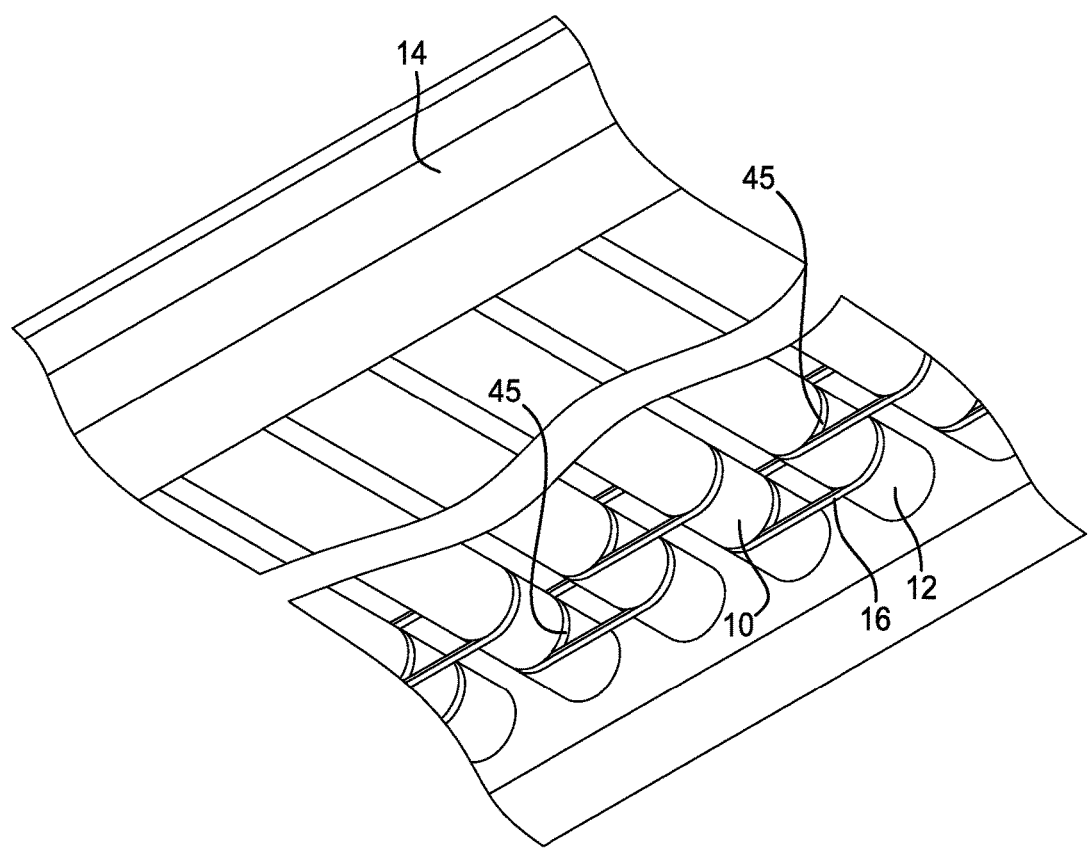
FIG. 3 is a close-up view of the conveyor system of FIG. 1.

FIG. 3 illustrates a close-up view of a master roller 10 connected to a frame 14. The frame 14 includes two sides that the master roller 10 and the slave roller 12 span between. The master roller 10 (motor shaped as roller) and the slave rollers 12 are driven by transfer devices 16 that extend between grooves 45 of the master roller 10 and the slave rollers 12, and also extend between grooves 45 of the slave rollers 12.

Figure 4:
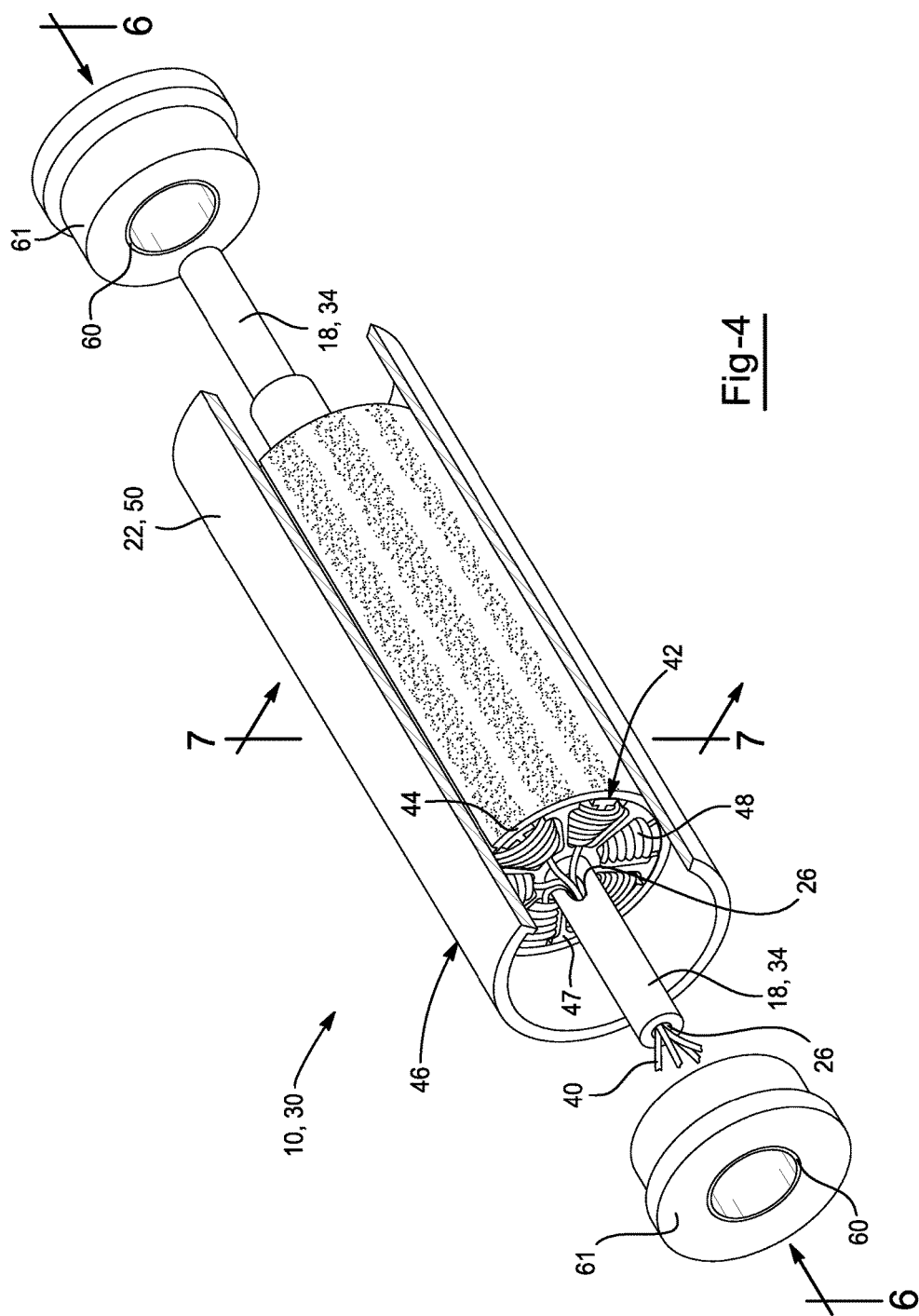
FIG. 4 is a perspective cut away view of a partially exploded motorized roller that is a master roller.
Figure 5:
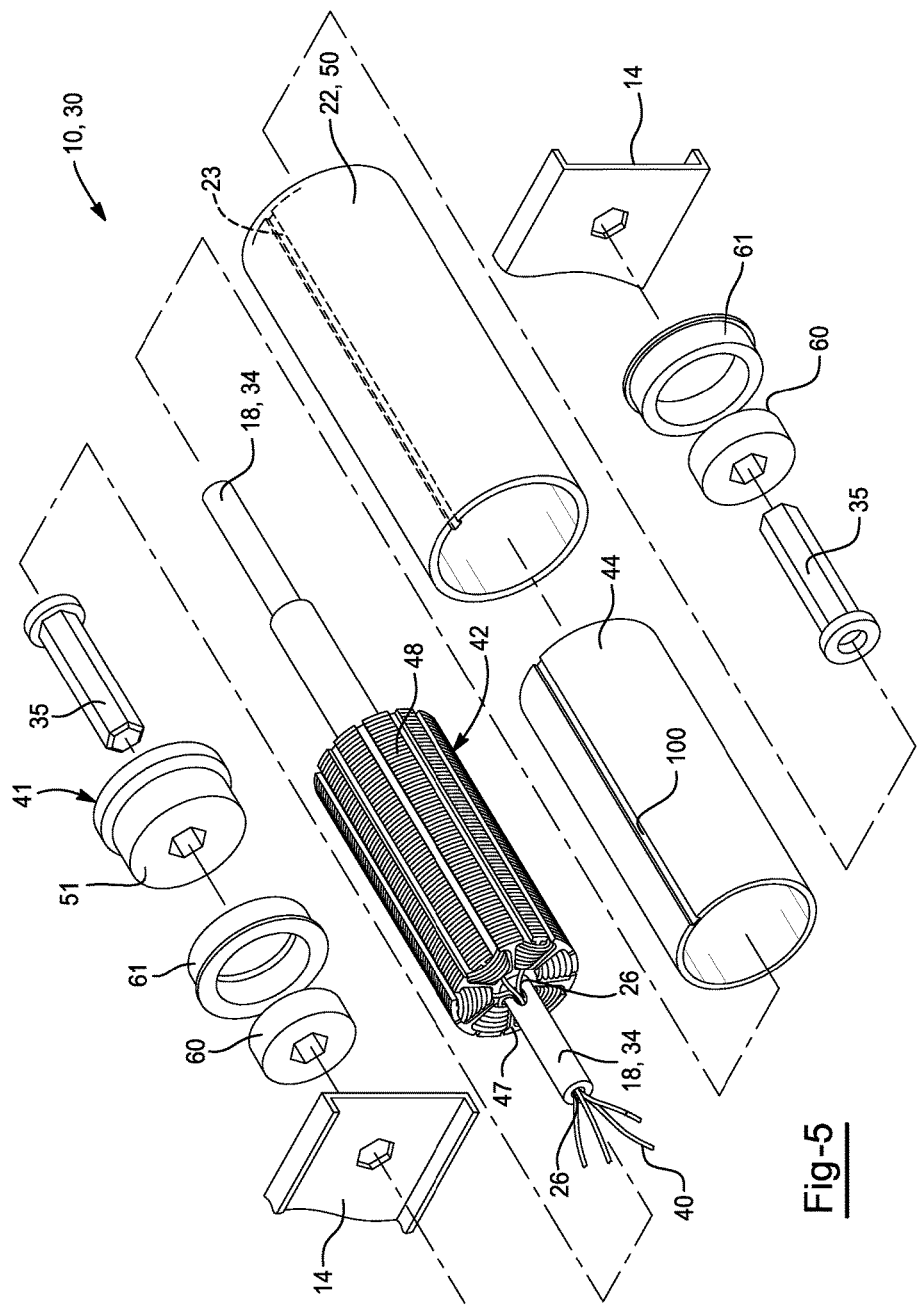
FIG. 5 is an exploded view of a motorized roller that is a master roller.

FIG. 4 illustrates a perspective view of a motor 30 that is a master roller 10. The motor 30 includes a motor stator 42 mounted to a roller shaft 18 that is a hollow motor shaft 34, and is surrounded by a motor rotor 46. The motor rotor 46 includes a roller tube 22 that is a motor housing 50 and encompasses a ring magnet 44. The motor stator 42 includes a plurality of motor windings 48 wrapped around a stator hub 47 and receiving power through one or more wires 40 fed through a hole 26 and running through the roller shaft 18. Each end of the roller shaft 18 is fed through a bearing 60 encased in a bearing housing 61 so that the roller shaft 18 remains stationary relative to the frame (not shown) when the motor stator 42 rotates. The roller shaft 18 also includes additional holes 26 to connect the one or more wires 40 to the motor 30, to provide ventilation and intake of air, or both FIG. 5 is an exploded view of a motor 30 that is a master roller 10. The motor 30 includes a motor stator 42 mounted to a roller shaft 18 that is a hollow motor shaft 34, and is surrounded by a ring magnet 44 and a roller tube 22 that is a motor housing 50. The motor stator 42 includes a plurality of motor windings 48 wound around a stator hub 47 that are receiving power through one or more wires 40 fed through a hole 26 and running through the roller shaft 18. The ring magnet 44 is located within the roller tube 22, where a key 23 of the roller tube 22 mates to a key recess 100 of the ring magnet 44. A proximal end and a distal end of the roller shaft 18 are inserted into a hexagonally-shaped shaft cover 35, which are then inserted into a bearing 60 encased in a bearing housing 61, and secured to a frame 14. When the shaft covers 35 are inserted into the bearings 60, the shaft 18 remains stationary while the ring magnet 44 and roller tube 22 are able to synchronously rotate about the shaft 18. The controller housing 51 houses a controller 41 that is secured to the shaft cover 35 and is adjacent to the motor windings 48. The roller shaft 18 also includes additional holes 26 to connect the one or more wires 40 to the motor 30, to provide ventilation and intake of air, or both.

FIG. 6A is a cross-sectional view of FIG. 4 cut along line 6-6. The motor 30 is a master roller 10. The motor 30 includes a motor stator 42 and a motor rotor 46. The motor stator 42 includes a plurality of motor windings 48 mounted to a roller shaft 18 that is a hollow motor shaft 34. The motor windings 48 are wound around a stator hub (not shown) and are receiving power through one or more wires 40 fed through a hole 26 and running through the roller shaft 18. A controller housing 51 houses a controller 41 that is adjacent to the motor windings 48. The controller 41 includes a microprocessor 57, a printed circuit board (PCB) 58, and a power switching device 59, which are connected to, and in conjunction with, the motor stator 42 through the one or more wires 40 A separating wall 52 separates the controller 41 from the motor windings 48. A plurality of ring magnets 44 are connected to each other by an adhesive layer 24. The plurality of ring magnets 44 is encompassed by a roller tube 22 that is a motor housing 50 to form the motor rotor 46. The roller tube 22 rests along the roller shaft 18 by a plurality of bearings 60 that are flexible sleeve bearings 66 to allow for rotation of the roller tube 22 about the roller shaft 18. Each bearing 60 includes a flexible sleeve 62 that rests on the roller shaft 18. The roller shaft 18 is fed through a frame 14 on a proximal end and a distal end, and includes a plurality of additional holes 26 to allow air flow 82 to reach the motor.

FIG. 6B is a cross-sectional view of a motor 30. The motor 30 is a master roller 10. The motor 30 includes a motor stator 42 and a motor rotor 46. The motor stator 42 includes a plurality of motor windings 48 in a motor housing 50 mounted to a roller shaft 18 that is a hollow motor shaft 34. The motor windings 48 are wound around a stator hub (not shown) and are receiving power through one or more wires 40 fed through a hole 26 and running through the roller shaft 18. A controller housing 51 houses a controller 41 mounted to a frame 14 by one or more fasteners 28. The controller 41 includes microprocessor 57, a printed circuit board (PCB) 58, and a power switching device 59, which are connected to, and in conjunction with, the motor stator 42 through the one or more wires 40. A plurality of ring magnets 44 are connected to each other by an adhesive layer 24. The plurality of ring magnets 44 is encompassed by a roller tube 22 that is a motor housing 50 to form the motor rotor 46. The roller tube 22 rests along the roller shaft 18 by a plurality of bearings 60 that are flexible sleeve bearings 66 to allow for rotation of the roller tube 22 about the roller shaft 18. Each bearing 60 includes a flexible sleeve 62 that rests on the roller shaft 18. The roller shaft 18 is fed through a frame 14 on a proximal end and a distal end, and includes a plurality of additional holes 26 to allow air flow 82 to reach the motor.

FIG. 6C is a cross-sectional view of a motor 30. The motor 30 is a master roller 10. The motor 30 includes a plurality of motor stators 42 and a motor rotor 46. Each of the motor stators 42 includes a plurality of motor windings 48 mounted to a roller shaft 18 that is a hollow motor shaft 34. The motor windings 48 are wound around a stator hub (not shown) and are receiving power through one or more wires 40 fed through a hole 26 and running through the roller shaft 18. A controller housing 51 houses a controller 41 that is adjacent to the motor windings 48. The controller 41 includes a microprocessor 57, a printed circuit board (PCB) 58, and a power switching device 59, which are connected to, and in conjunction with, the plurality of motor stators 42 through the one or more wires 40 A separating wall 52 separates the controller 41 from the motor windings 48. A plurality of ring magnets 44 are connected to each other by an adhesive layer 24. The plurality of ring magnets 44 is encompassed by a roller tube 22 that is a motor housing 50 to form the motor rotor 46. The roller tube 22 rests along the roller shaft 18 by a plurality of bearings 60 that are flexible sleeve bearings 66 to allow for rotation of the roller tube 22 about the roller shaft 18. Each bearing 60 includes a flexible sleeve 62 that rests on the roller shaft 18. The roller shaft 18 is fed through a frame 14 on a proximal end and a distal end, and includes a plurality of additional holes 26 to allow air flow 82 to reach the motor.

Figure 7A:
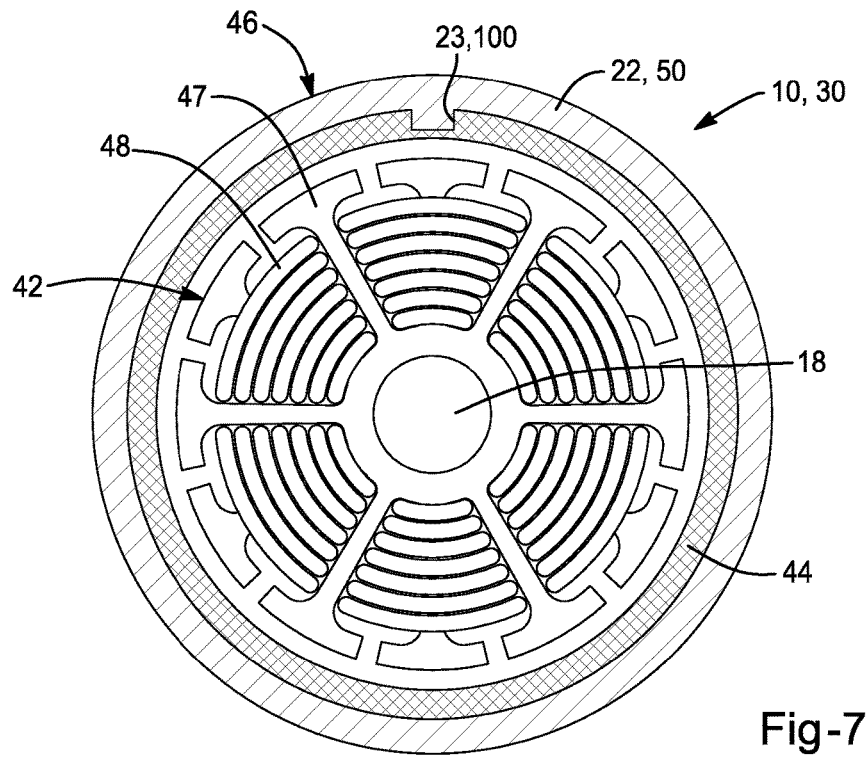
FIG. 7A is a cross-sectional view 7-7 of the master roller of FIG. 4.

FIG. 7A is a cross-sectional view of FIG. 4 cut along line 7-7. The motor 30 is a master roller 10. A key recess 100 of a ring magnet 44 is mated to a key 23 protruding from an interior surface of a roller tube 22 of the master roller 10 to form a motor rotor 46. A motor stator 42 including a plurality of motor windings 48 wound around a stator hub 47 is located within the ring magnet 44 to generate sufficient torque to rotate the motor rotor 46. The motor stator 42 is secured to a roller shaft 18 and housed by a motor housing 50 that is the roller tube 22.

Figure 7B:
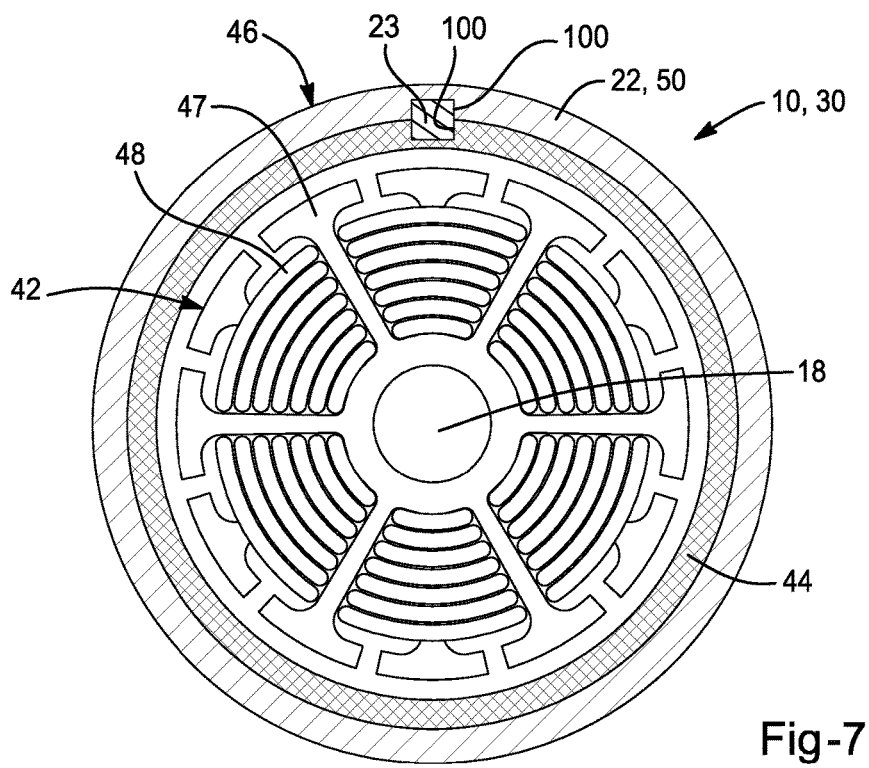
FIG. 7B is a cross-sectional view of a motorized roller that is a master roller.

FIG. 7B is a cross-sectional view a motor 30. The motor 30 is a master roller 10. A key recess 100 of a ring magnet 44 and a key recess 100 of a roller tube 22 are connected by inserting a key 23 into the key recesses 100 to form a motor rotor 46. A motor stator 42 including a plurality of motor windings 48 wound around a stator hub 47 is located within the ring magnet 44 to generate sufficient torque to rotate the motor rotor 46. The motor stator 42 is secured to a roller shaft 18 and housed by a motor housing 50 that is the roller tube 22.

Figure 8:
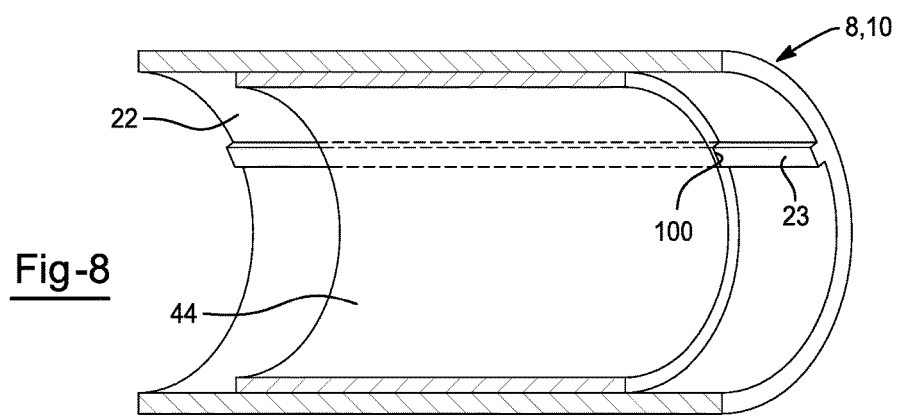
FIG. 8 is a cross-sectional view of a roller tube and ring magnet.

FIG. 8 is a cross-sectional view of a ring magnet 44 inside a roller tube 22 of a roller 8 that is a master roller 10. A key recess 100 of the ring magnet 44 is mated to a key 23 protruding from an interior surface of the roller tube 22 and extending a length of the roller tube 22.

Figure 9A:
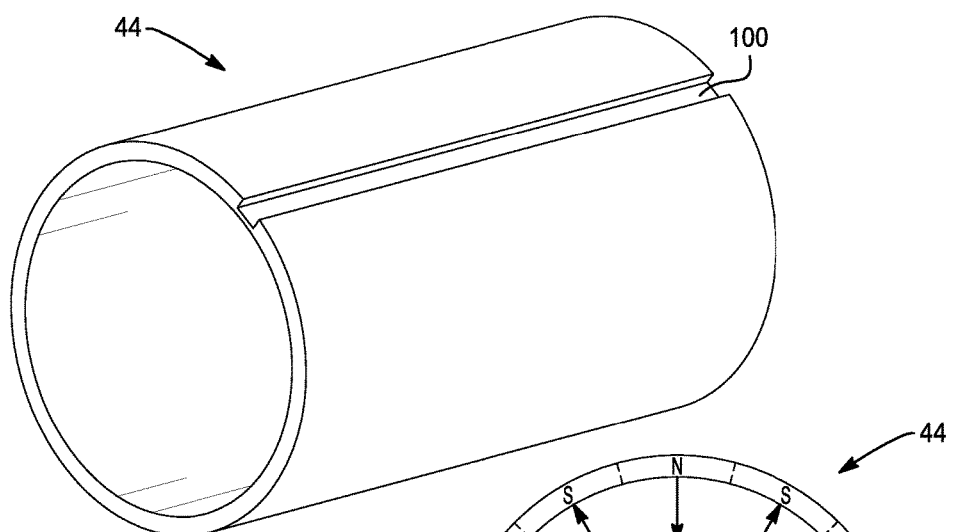
FIG. 9A is a perspective view of a ring magnet.

FIG. 9A is a perspective view of a ring magnet 44 including a key recess 100.

Figure 9B:
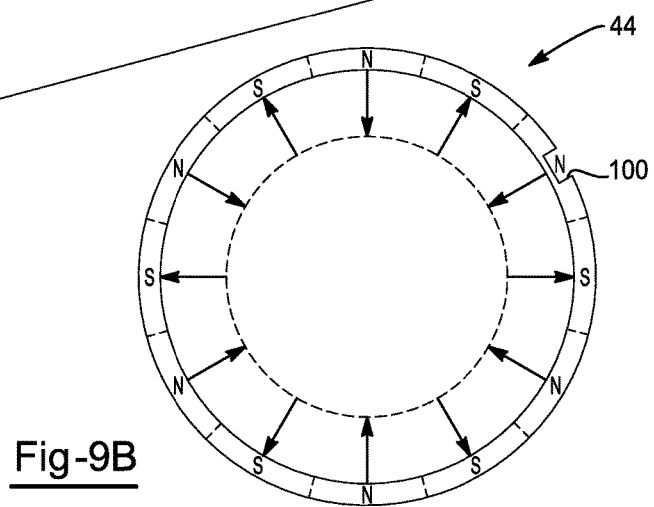
FIG. 9B is a cross-sectional view of the ring magnet of FIG. 9A illustrating magnetization.

FIG. 9B is a cross-sectional view of the ring magnet 44 including the key recess 100 of FIG. 9A, illustrating the magnetization pattern of the ring magnet 44. Dotted lines are shown for illustrative purposes to show the separation between North (N) and South (S).

Figure 10A:
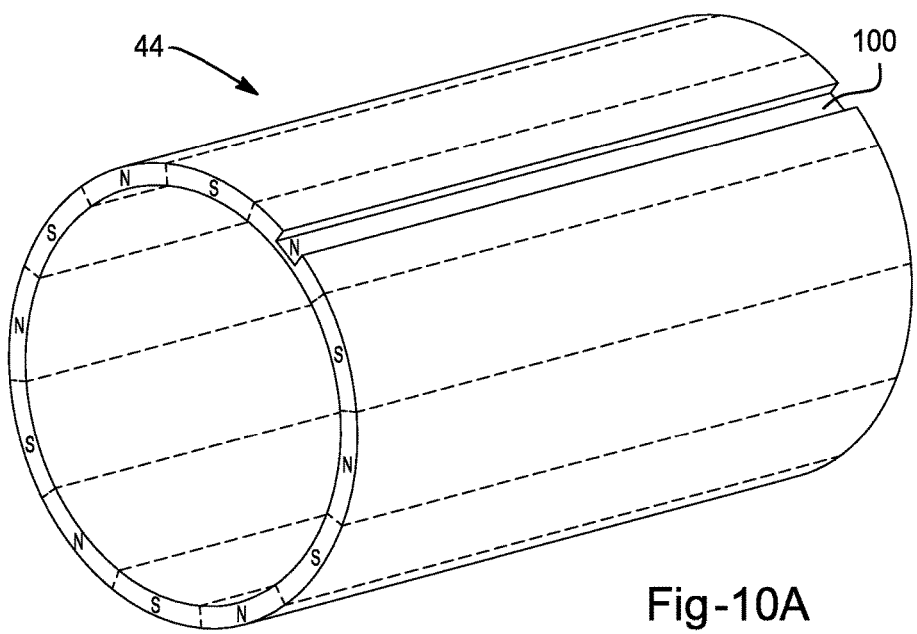
FIG. 10A is a perspective view of a ring magnet illustrating parallel magnetization.

FIG. 10A is a perspective view of a ring magnet 44 including a key recess 100, illustrating a parallel pattern of magnetization. Dotted lines are shown for illustrative purposes to show the separation between North (N) and South (S).

Figure 10B:
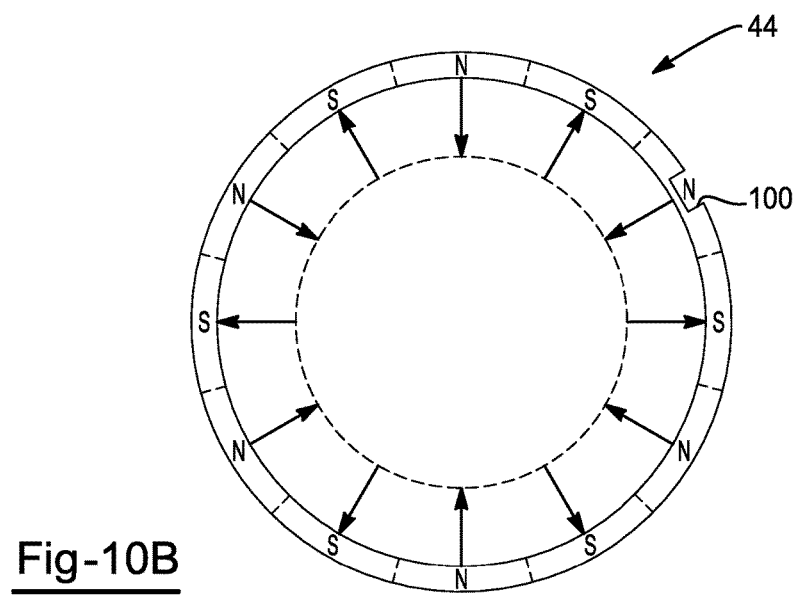
FIG. 10B is a cross-sectional view of the ring magnet of FIG. 10A illustrating parallel magnetization.

FIG. 10B is a cross-sectional view of the ring magnet 44 including the key recess 100 of FIG. 10A, illustrating the parallel pattern of magnetization. Dotted lines are shown for illustrative purposes to show the separation between North (N) and South (S).

Figure 11A:
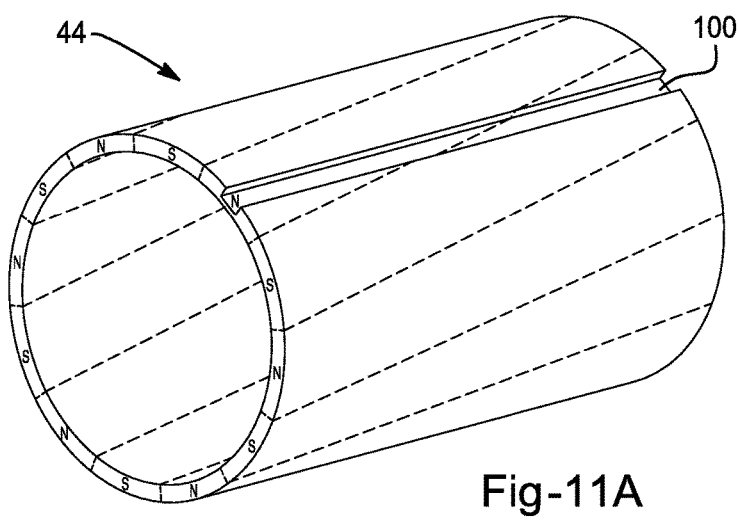
FIG. 11A is a perspective view of a ring magnet illustrating skewed magnetization relative to the motor axis or longitudinal axis.

FIG. 11A is a perspective view of a ring magnet 44 including a key recess 100, illustrating a skewed pattern of magnetization. Dotted lines are shown for illustrative purposes to show the separation between North (N) and South (S).

Figure 11B:
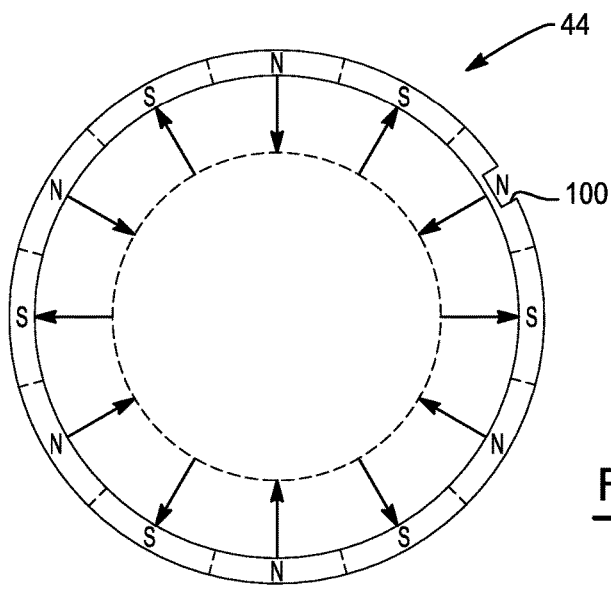
FIG. 11B is a cross-sectional view of the ring magnet of FIG. 11A illustrating skewed magnetization relative to the motor axis or longitudinal axis.

FIG. 11B is a cross-sectional view of the ring magnet 44 including the key recess 100 of FIG. 11A, illustrating the skewed pattern of magnetization. Dotted lines are shown for illustrative purposes to show the separation between North (N) and South (S).

Figure 12:
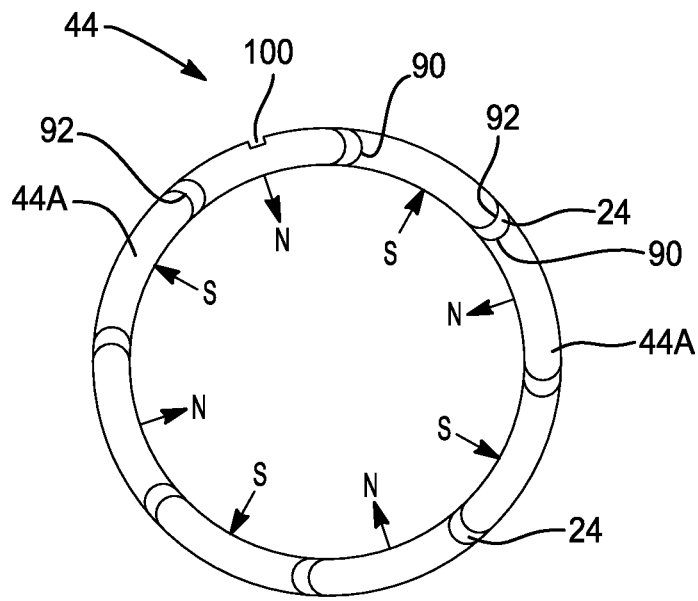
FIG. 12 is a cross-sectional view of a ring magnet including segments and illustrating magnetization.

FIG. 12 is a cross-sectional view of a ring magnet 44 including a plurality of ring magnet segments 44A. Each of the plurality of ring magnet segments 44A are connected together by an adhesive 24 that is located between a first mating end 90 of one ring magnet segment 44A and a second mating end 92 of a second ring magnet segment 44A. One of the ring magnet segments 44A includes a key recess 100. Ends may have locking device, which may be flat, round, or other shapes.

Figure 12A:
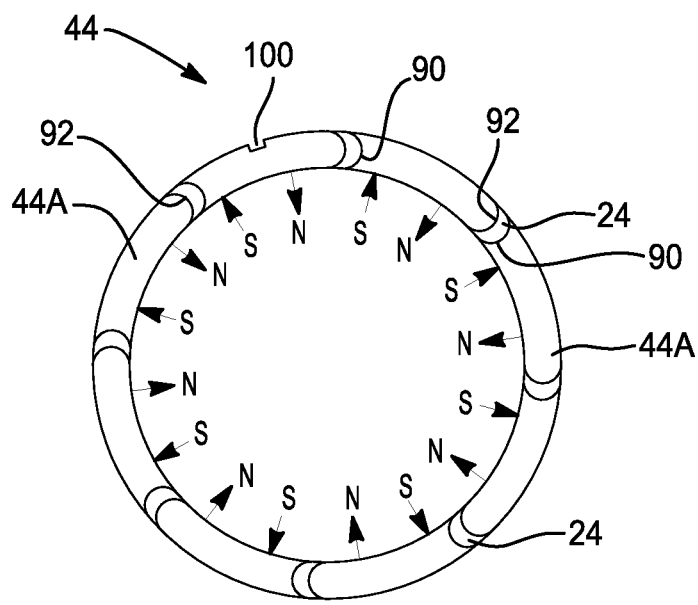
FIG. 12A is a cross-sectional view of a ring magnet including segments and illustrating magnetization where the number of the segments and the number of magnetic poles are not equal.

FIG. 12A is a cross-sectional view of a ring magnet 44 including a plurality of ring magnet segments 44A. Each of the plurality of ring magnet segments 44A are connected together by an adhesive 24 that is located between a first mating end 90 of one ring magnet segment 44A and a second mating end 92 of a second ring magnet segment 44A. One of the ring magnet segments 44A includes a key recess 100. Ends may have locking device, which may be flat, round, or other shapes. This ring magnet segments are magnetized so that the number of magnetic poles are two times higher than the number of segments.

FIG. 13A illustrates a perspective view of a motor 30 that is a master roller 10. The master roller 10 includes a hollow roller tube 22. The hollow roller tube 22 includes a plurality of grooves 45 to receive and drive one or more transfer devices 16 such as an o-ring belt (not shown). An over roller cartridge 5 is located on an outside surface of the hollow roller tube 22 to receive a transfer device such as a v-belt (not shown). The master roller 10 is adapted to receive one or more o-ring belts, one or more v-belts, or a combination of both o-ring and v-belts. A hollow roller shaft 18 that is a motor shaft 34 is located within the roller tube 22 and extends longitudinally along an axis of rotation of the master roller 10. The roller shaft 18 includes a shaft cover 35 secured to a proximal end and shaft cover 35 secured to a distal end. The roller shaft 18 also includes a hole 26 to receive wires (not shown) connected to the motor 30. The shaft 18 is fed through a plurality of bearings 60 that are flexible sleeve bearings 61 located within a bearing housing 65.

FIG. 13B illustrates a perspective view of a motor 30 that is a master roller 10. The master roller 10 includes a hollow roller tube 22. The hollow roller tube 22 includes a plurality of grooves 45 to receive and drive one or more transfer devices, such as an o-ring belt (not shown). An over roller cartridge 5 is located on an outside surface of the hollow roller tube 22 to receive a transfer device such as a chain (not shown). The master roller 10 is adapted to receive one or more o-ring belts, one or more chains, or a combination of both o-ring belts and chains. A hollow roller shaft 18 that is a motor shaft 34 is located within the roller tube 22 and extends longitudinally along an axis of rotation of the master roller 10. The roller shaft 18 includes a shaft cover 35 secured to a proximal end and shaft cover 35 secured to a distal end. The roller shaft 18 also includes a hole 26 to receive wires (not shown) connected to the motor 30. The shaft 18 is fed through a plurality of bearings 60 encased in a bearing housing 61.

FIG. 14 illustrates an exploded view of a motor 30 that is a master roller 10. The motor 30 includes a motor stator 42 surrounded by a plurality of ring magnets 44. The motor stator 42 includes a plurality of motor windings 48 wound around a stator hub 47 and is receiving power through one or more wires (not shown). The motor stator 42 is mounted to a roller shaft 18 that is a motor shaft 34. The motor stator 42 is secured to the roller shaft 18 by a key 23 to stop rotation of the motor stator 42 relative to the roller shaft 18. A controller 41 abuts the motor windings 48 and includes a microprocessor 57, a printed circuit board (PCB) 58, and a power switching device 59. The controller 41 is connected to, and in conjunction with, the motor stator 42 by the one or more wires (not shown). A sensor 56 is mounted to the controller 41 and senses rotation and speed of the ring magnets 44. The roller shaft 18 includes a shaft cover 35 secured to a proximal end and shaft cover 35 secured to a distal end. The shaft 18 is fed through a plurality of bearings 60 encased in a bearing housing 61. A plurality of snap rings 55 secures the bearings 60 from axial movement. An additional snap ring 55 secures the motor stator 42 from axial movement. The ring magnets 44 are located within a roller tube 22 that is a motor housing 50. The roller tube 22 includes a plurality of grooves 45 to receive and drive one or more transfer devices such as an o-ring belt (not shown). An over roller cartridge 5 is located on an outside surface of the hollow roller tube 22 to receive a transfer device such as a v-belt (not shown). The master roller 10 is adapted to receive one or more o-ring belts, one or more v-belts, or a combination of both o-ring and v-belts. A key recess 100 of the ring magnets 44 and a key recess 100 of the roller tube 22 are mated by a key (not shown) inserted between the key recesses 100 to secure the ring magnets 44 to the roller tube 22.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Conveyor System
2A Roller conveyor
2B Belt conveyor
4 Zone
5 Over Roller Cartridge
6 Support Device
8 Rollers
10 Master Roller
12 Slave Roller
13 Support
14 Frame
16 Transfer Device
16A Flexible Coupling
16B Conveyor Belt
18 Roller Shaft
22 Roller Tube
23 Key
24 Adhesive
26 Hole
28 Fastener
30 Motor
34 Motor Shaft
35 Shaft Cover
40 Wires
41 Controller
42 Motor Stator
44 Ring Magnet
44A Ring Magnet Segments
45 Groove
46 Motor Rotor
47 Stator Hub
48 Motor Windings
50 Motor Housing
51 Controller Housing
52 Separating Wall
55 Snap Ring
56 Sensor
57 Microprocessor
58 Printed Circuit Board (PCB)
59 power Switching Device
60 Bearing
61 Bearing Housing
62 Flexible Sleeve
63 Flange Bearing
64 Adjustable portions
66 Flexible Sleeve Bearing
80 Direction of Movement
82 Air flow
90 First Mating End
92 Second Mating End
100 Key Recess

I claim:
1. A brushless DC motor comprising:
 a. one or more motor stators including a plurality of motor windings;
 b. a roller shaft connected to the one or more motor stators, the roller shaft extending along a longitudinal axis of the brushless DC motor and being adapted to span between two frame members; and
 c. a motor rotor including:
  i. a roller tube of magnetic material, the roller tube including a key, a key recess, or both, and
  ii. one or more ring magnets magnetized radially with multi poles, the one or more ring magnets having:
   1. a mating surface shaped to substantially mate to a mating surface of the roller tube and
   2. the one or more ring magnets being made of neodymium, iron, and boron (NdFeBr) or Samarium and Cobalt (SmCo) and being formed through sintering or a hot press process; and
   3. a key recess that receives the key of the roller tube, that receives a separate key that extends into the key recess of one of the one or more ring magnets and the key recess, or both;
  and, wherein a plurality of bearings are located between the roller tube and the roller shaft so that the roller tube and the roller shaft are movable relative to each other.

2. The brushless DC motor of claim 1, wherein the one or more ring magnets are made of two or more segmented arc shaped magnets, each of the two or more segmented arc shaped magnets including a first mating end and a second mating end, and a first mating end of one of the two or more segmented arc shaped magnets is bonded together at a second mating end of a second of the two or more segmented arc shaped magnets to form ring magnets.

3. The brushless DC motor of claim 1, wherein the key is an integrally formed part of the mating surface of the roller tube that spans all or a portion of a length of the roller tube parallel to the longitudinal axis of the motor to engage the key recess of the one or more ring magnets.

4. The brushless DC motor of claim 1, wherein a pattern of magnetization of the one or more ring magnets is a parallel pattern, a skewed pattern to the longitudinal axis, or a combination thereof.

5. The brushless DC motor of claim 1, wherein the one or more ring magnets are spaced apart and free of contact between one another during installation, during running, or both.

6. The brushless DC motor of claim 1, wherein the brushless DC motor includes one or more controllers connected to the plurality of motor windings, the one or more controllers having one or more positions sensors to determine movement of the motor rotor relative to the one or more motor stators at a starting position and during running.

7. The brushless DC motor of claim 6, wherein the one or more position sensors are a Hall Effect sensor, a resolver, an encoder, or a combination thereof.

8. The brushless DC motor of claim 1, wherein the brushless DC motor includes one or more controllers connected to the plurality of motor windings, the one or more controllers being free of position sensors to determine movement of the motor rotor.

9. The brushless DC motor of claim 1, wherein the brushless DC motor includes one or more controllers located outside of the roller tube and mounted to one of the two frame members.

10. The brushless DC motor of claim 1, wherein the brushless DC motor includes one or more controllers located outside of the roller tube and mounted on a remote location plate and being free of mounting on the two frame members.

11. The brushless DC motor of claim 1, wherein the roller shaft is hollow from end to end and includes holes on the side inside the motor to allow air, liquid, gas, or a combination thereof, to reach and cool the motor.

12. The brushless DC motor of claim 1, wherein the motor has a plurality of motor stators mounted on the roller shaft and electrically connected to each other and controlled by a single controller or independent controllers.

13. The brushless DC motor of claim 1, wherein a proximal end, a distal end, or both of the roller shaft are shaped substantially hexagonally to be received by a substantially hexagonally shaped inner diameter of the plurality of bearings.

14. The brushless DC motor of claim 1, wherein the motor has a plurality of motors stators mounted on the roller shaft, and each stator is controlled by a separate controller.

15. The brushless DC motor of claim 2, wherein a number of radially magnetized poles on the one or more ring magnets is not equal to a number of arc segments in the one or more ring magnets.

16. The motor of claim 2 wherein the two or more segmented arc shaped magnets are not touching each other, and a space between the two or more segmented arc shaped magnets is filled by molding material.

17. A conveyor system comprising:
a. one or more transfer devices; and
b. a plurality of rollers including:
  i. one or more master rollers, wherein the one or more master rollers are the brushless DC motor of claim 1; and
  ii. one or more slave rollers in communication with the one or more master rollers by the one or more transfer devices.

18. A belt conveyor system, wherein the belt conveyor system includes one or more transfer devices that are a conveyor belt extending over one or more master rollers that are the brushless DC motors of claim 1 and one or more slave rollers so that the one or more master rollers and the one or more slave rollers are located inside of the conveyor belt.

19. A treadmill system with one or more brushless DC motors of claim 1, wherein the one or more brushless DC motors drive a treadmill belt with the treadmill belt going over the one or more brushless DC motors and one or more support devices.

20. The brushless DC motor of claim 1, wherein the brushless DC motor includes three or more bearings on the roller shaft with one located at each end of the roller tube and remaining bearings being located between the ends of the roller tube, wherein some of the three or more bearings have a flexible sleeve between an inner diameter of the three or more bearings and the roller shaft, some of the three or more bearings including a flexible sleeve between an outer diameter of the three or more bearings and a bearing housing, or both.

* * * * *